United States Patent
Tait et al.

(10) Patent No.: US 12,430,665 B2
(45) Date of Patent: Sep. 30, 2025

(54) DYNAMIC SWEEPSTAKES ENGINE FOR ONLINE GAMING

(71) Applicant: InfluenceInk, Inc., Rancho Misson Viejo, CA (US)

(72) Inventors: Mark Tait, Austin, TX (US); Josh Gause, Austin, TX (US)

(73) Assignee: Influencelnk, Inc., Rancho Mission Vijeo, CA (US)

( * ) Notice: Subject to any disclaimer, the term of this patent is extended or adjusted under 35 U.S.C. 154(b) by 0 days.

(21) Appl. No.: 18/116,178

(22) Filed: Mar. 1, 2023

(65) Prior Publication Data

US 2024/0211984 A1 Jun. 27, 2024

Related U.S. Application Data

(60) Provisional application No. 63/476,576, filed on Dec. 21, 2022.

(51) Int. Cl.
G06Q 30/02 (2023.01)
G06Q 30/0207 (2023.01)

(52) U.S. Cl.
CPC ..... *G06Q 30/0212* (2013.01); *G06Q 30/0209* (2013.01)

(58) Field of Classification Search
CPC .................................. G06Q 30/0207–30/0277
See application file for complete search history.

(56) References Cited

U.S. PATENT DOCUMENTS 8,246,466 B2 * 8/2012 Herrmann ............... G07F 17/32
463/31
9,616,344 B2 * 4/2017 Wang ..................... G06Q 10/00
(Continued)

FOREIGN PATENT DOCUMENTS

KR 2021-0020606 A * 8/2019
WO WO2015/168749 A1 11/2015

*Primary Examiner* — Thuy N Nguyen
(74) *Attorney, Agent, or Firm* — Alan M. Sack; John F. Vodopia; SACK IP Law p.c.

(57) ABSTRACT

The present specification discloses a dynamic sweepstakes engine for online computer gaming. The sweepstakes engine automatically varies parameters of a sweepstakes in direct correlation to the gaming behavior of users interacting with an online computer game. The sweepstakes engine is configured to automatically generate and spawn new sweepstakes in response to the conclusion of existing sweepstakes to maintain a constant Return To Player (RTP) value within the computer game. The sweepstakes engine is configured to automatically generate a set of sweepstakes rules based upon the geographic location of users as taken from their IP address. The sweepstakes engine utilizes a sweepstakes rules database to generate a set of rules that are pushed out to a sweepstakes rules website as well as gaming players. Allowing for the automatic generating and spawning of sweepstakes allows for the sweepstakes engine to actively engage with a large sweepstakes gaming online community and maintain a constant RTP value based upon the varying player population levels. The sweepstakes engine is also able to maintain a constant RTP value by having the ability to automatically shorten the duration of the sweepstakes or increase prize amounts based on the gaming behavior of users through the submission of sweepstakes entries to the sweepstakes engine.

7 Claims, 20 Drawing Sheets

(56) References Cited

U.S. PATENT DOCUMENTS

| | | | |
|---|---|---|---|
| 9,940,786 B1* | 4/2018 | Lucci | G07F 17/3286 |
| 2005/0208989 A1* | 9/2005 | Kane | G07F 17/32 |
| | | | 463/16 |
| 2006/0252483 A1* | 11/2006 | Avery | G07F 17/32 |
| | | | 463/16 |
| 2008/0039173 A1* | 2/2008 | Walther | G07F 17/3258 |
| | | | 463/17 |
| 2009/0170608 A1* | 7/2009 | Herrmann | A63F 9/24 |
| | | | 463/42 |
| 2011/0092267 A1* | 4/2011 | Hardy | G07F 17/3255 |
| | | | 463/17 |
| 2011/0218032 A1* | 9/2011 | Baerlocher | G07F 17/34 |
| | | | 463/25 |
| 2012/0143663 A1* | 6/2012 | Miller | G06Q 30/0212 |
| | | | 705/14.14 |
| 2013/0244746 A1* | 9/2013 | Hardy | G07F 17/3267 |
| | | | 463/17 |
| 2015/0050988 A1* | 2/2015 | Nichols | G07F 17/3237 |
| | | | 463/25 |
| 2015/0279150 A1* | 10/2015 | Alexander | G07F 17/326 |
| | | | 463/17 |
| 2017/0351777 A1* | 12/2017 | Ross | G07F 17/329 |
| 2020/0065843 A1* | 2/2020 | Seei | G06Q 30/0236 |
| 2021/0065505 A1 | 3/2021 | Rousseau et al. | |
| 2022/0092908 A1* | 3/2022 | Cleveland | G07F 17/3276 |
| 2022/0374874 A1 | 11/2022 | Irwin, Jr. et al. | |

\* cited by examiner

Player Population Growth Problem (Constant Daily Prize Payout)
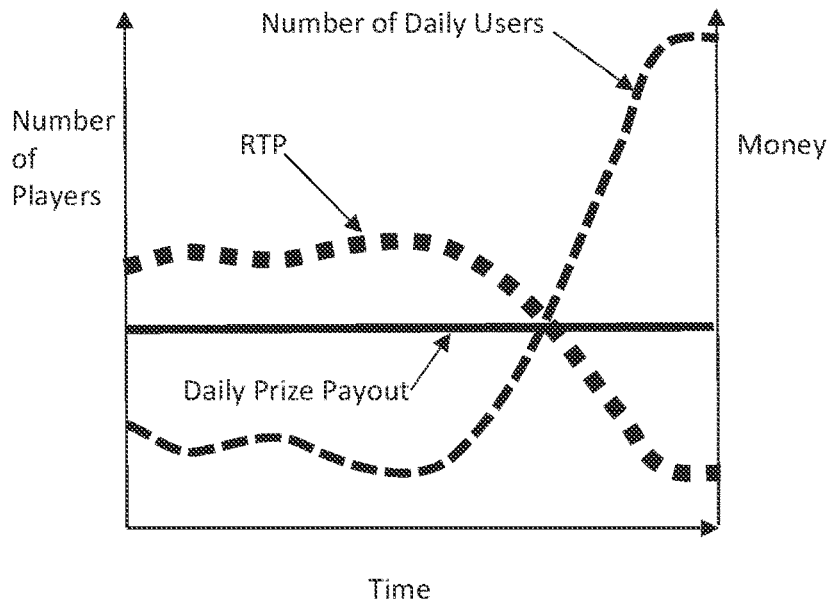
Declining Player Population Problem (Constant Daily Prize Payout)
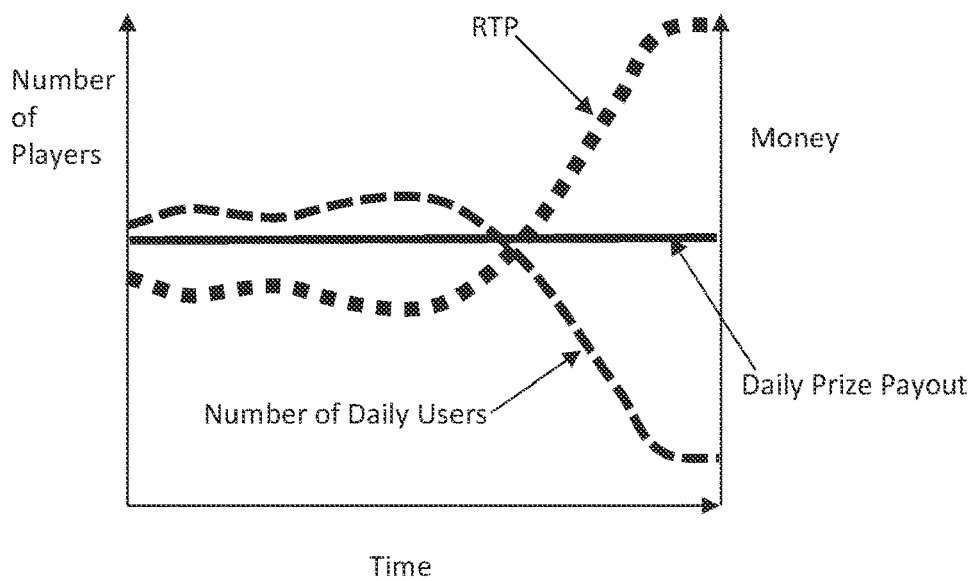
FIG. 1 (PRIOR ART)

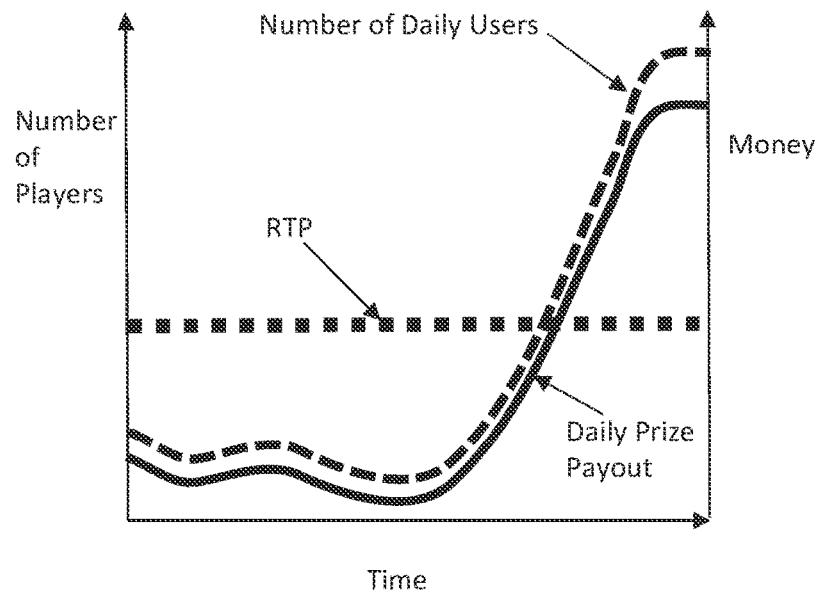
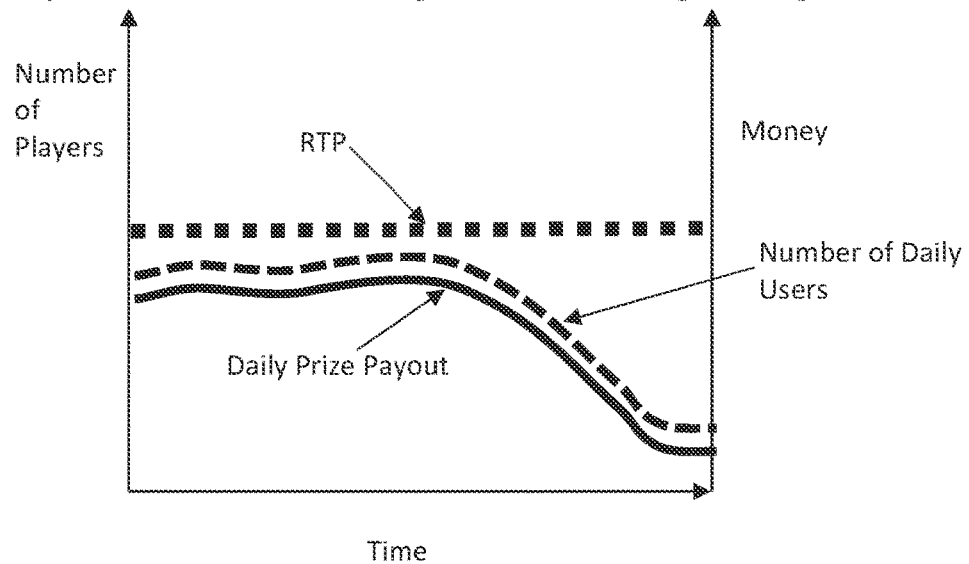
FIG. 2

Sweepstakes Entry Blockchain 56

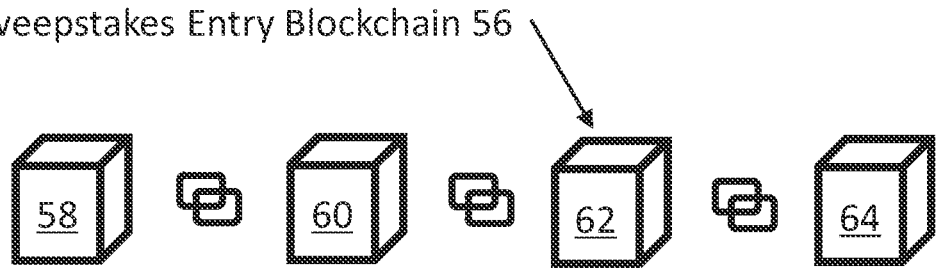

| SWEEPSTAKES ENTRY BLOCKCHAIN GENESIS BLOCK 58 | INFORMATION IN BLOCK:<br>*SWEEPSTAKES METADATA (ID number of contest, start date, legal regulatory information, contest rules)<br>*Blockchain Data: Sweepstakes Contest Data Information<br>*Blockchain Metadata: Metadata wrapper (blockchain hash digest of block 58) |
|---|---|

| SWEEPSTAKES ENTRY DATA BLOCKCHAIN BLOCK 60 | INFORMATION IN BLOCK:<br>*Blockchain Data: ENTRY ID, GAME PLAYER ID, IP ADDRESS INFORMATION FOR REGULATORY COMPLIANCE, NUMBER OF ENTRIES<br>*Blockchain Metadata: Metadata wrapper (blockchain hash digest of block 58 [prior block] and blockchain hash digest of block 60 [current block]) |
|---|---|

| SWEEPSTAKES ENTRY DATA BLOCKCHAIN BLOCK 62 | INFORMATION IN BLOCK:<br>*Blockchain Data: ENTRY ID, GAME PLAYER ID, IP ADDRESS INFORMATION FOR REGULATORY COMPLIANCE, NUMBER OF ENTRIES<br>*Blockchain Metadata: Metadata wrapper (blockchain hash digest of block 60 [prior block] and blockchain hash digest of block 62 [current block]) |
|---|---|

| SWEEPSTAKES WINNING DATA BLOCKCHAIN BLOCK 64 | INFORMATION IN BLOCK:<br>*Blockchain Data: ENTRY ID, GAME PLAYER ID, IP ADDRESS INFORMATION FOR REGULATORY COMPLIANCE, WINNING SELECTION INFORMATION<br>*Blockchain Metadata: Metadata wrapper (blockchain hash digest of block 62 [prior block] and blockchain hash digest of block 64 [current block]) |
|---|---|

FIG. 14

DYNAMIC SWEEPSTAKES ENGINE FOR ONLINE GAMING

CROSS REFERENCE TO PRIORITY APPLICATION:

This application claims priority of U.S. Provisional Application No. 63/476,576 filed on Dec. 21, 2022, the disclosure of which is incorporated by reference in this application.

BACKGROUND OF THE SPECIFICATION

Computer games are an important source of entertainment and enjoyment. The growth of interconnectivity, bandwidth, computer, network, and telecommunications infrastructure has facilitated massive growth of computer games to online communities of users. As more and more users of computer games move online, the online computer gaming market is predicted to grow massively over the coming years. The substantial growth in technological innovation of computer networks has created vast opportunities for developers of computer games to capitalize on the surging online computer gaming market. A critical challenge in creating online computer games that grow communities of users is how to maintain a reward system that attracts and incentivizes users to continue to engage with and play the computer game.

SUMMARY OF THE SPECIFICATION

The present specification discloses a dynamic sweepstakes engine for online computer gaming. The sweepstakes engine automatically varies parameters of a sweepstakes in direct correlation to the gaming behavior of users interacting with an online computer game. One parameter of a sweepstakes that can be varied is the type and amount of a sweepstakes prize. Another parameter of a sweepstakes that can be varied is the duration of the sweepstakes. Gaming players enter the sweepstakes with entries earned through the online computer game. The more gaming players interact with the game and achieve higher gaming levels, the increased number of entries the gaming players can earn to enter into a particular sweepstake. A sweepstakes may vary in duration based upon a set threshold being met. For example, one such threshold may be the number of entries entered into the sweepstakes. If an entry-based threshold is set at 100,000 entries, the duration of the sweepstakes will be kept ongoing until gaming users enter 100,000 entries into the sweepstakes that are earned through online computer game play. The faster the users play the online computer game and earn entries, the faster the gaming community of players can trigger the threshold for the sweepstakes and earn prizes. Thus, this variable duration sweepstakes based upon a set number of sweepstakes entries incentivizes a community of players to play the online computer game more often to trigger sweepstakes prizes. While referred to as entries, these entries in the game could take a variety of forms such as a digital blockchain based currency, a non-fungible token, or a digital sweepstakes ticket.

In this sweepstakes prize system, the variable duration of the sweepstakes prize incentivizes gaming players to play more of the game to earn sweepstakes prizes faster. Alternatively, the type or amount of the prize in the sweepstakes may vary based upon the amount of entries by users during a fixed duration sweepstakes. In a fixed duration sweepstakes, the community of gaming players may trigger different levels or amounts of prizes based upon meeting different increasing threshold levels of entries. Small levels of entries during a fixed duration sweepstakes would trigger small prizes based on thresholds set in a sweepstakes gaming manager system. Large levels of entries during a fixed duration sweepstakes would trigger larger prizes based on higher thresholds set within the sweepstakes gaming manager system. Entries are generally earned by gaming players during their interaction with the online computer game. Alternatively, users may acquire entries through an Alternative Method of Entry (AMOE). The ability to enter into the sweepstakes may depend upon the users meeting a minimum threshold level of online computer game play. This minimum level of online computer play may be based upon the level in the game, or the completion of certain tasks, or competitions within the game. Online gaming and sweepstakes are activities that are regulated by national and local governments.

The current sweepstakes engine will determine the ability of gaming player to enter into and participate in the sweepstakes based upon a gaming player's stated residence in a user profile, or based upon their GPS coordinates during game play. The sweepstakes engine is capable of varying the prize type, amount, or sweepstakes duration based upon a rules engine that contains national and local laws regulating online sweepstakes. The ability of gaming players to enter the sweepstakes is regulated by the sweepstakes engine based upon their location and the laws of that jurisdiction. The sweepstakes engine is configured to automatically generate and spawn new sweepstakes in response to the conclusion of existing sweepstakes to maintain a constant Return To Player (RTP) value within the computer game. The sweepstakes engine is configured to automatically generate a set of sweepstakes rules based upon the geographic location of users as taken from their IP address. The sweepstakes engine utilizes a sweepstakes rules database to generate a set of rules that are pushed out to a sweepstakes rules website as well as gaming players. Allowing for the automatic generating and spawning of sweepstakes allows for the sweepstakes engine to actively engage with a large sweepstakes gaming online community and maintain a constant RTP based upon the varying player population levels.

The present specification discloses a non-volatile computer tangible medium containing instructions to spawn sweepstakes contests with a fixed prize value and a variable duration within an online computer game. The instructions include an online computer game where players accrue sweepstakes entries. The sweepstakes entries are accrued by playing the online computer game or through an Alternative Method of Entry (AMOE). A cloud-based sweepstakes engine manages a sweepstakes contest. The cloud-based sweepstakes engine collects sweepstakes entries from players that are entered into the sweepstakes contest through the online computer game. The sweepstakes contest has a fixed initial duration that is accelerated to an earlier date if an amount of sweepstakes entries collected by the sweepstakes engine reaches a set threshold. The sweepstakes contest is awarded when the amount of sweepstakes entries reaches a set threshold before the fixed initial duration of the sweepstakes contest expires. The sweepstakes contest is awarded when the fixed initial duration expires if the amount of sweepstakes entries does not reach the set threshold. The online computer game includes a Graphical User Interface through which users select the amount of sweepstakes entries to push to the sweepstakes engine for entry into the sweepstakes contest. The online computer game is executed on a portable electronic device or a computer terminal. The online computer game is in bi-directional communication with the sweepstakes engine through a distributed computer network. The sweepstakes engine pushes winner information to the online computer game when a winning sweepstakes entry is selected. The sweepstakes engine automatically spawns a new sweepstakes contest for play on the online computer game when the sweepstakes contest is finished and a prize is awarded.

The sweepstakes engine automatically generates a set of rules of the new sweepstakes contest from a database of geographic based sweepstakes rules. The sweepstakes engine automatically pushes the set of rules for the new sweepstakes for online publication on a website for sweepstakes contest rules for public viewing. The sweepstakes engine limits access to play the new sweepstakes contest to those online computer games that have an IP address within a geographic area set for the new sweepstakes contest. The sweepstakes entries are selected from the group consisting of electronic tickets, electronic entries, cryptocurrency, Non-Fungible Tokens (NFTs), electronic money, digital currency, or other form of entry. The sweepstakes engine automatically spawns new sweepstakes contests to maintain a constant Return To Player value for players of the online computer game through the sweepstakes contests. The sweepstakes engine records collected sweepstakes entries within a sweepstakes contest blockchain. The sweepstakes contest blockchain is used to award a winner of the sweepstakes contest by randomly selecting a blockchain block from the sweepstakes contest blockchain and naming the player who entered the sweepstakes entry into the selected blockchain block as the winner.

The present specification discloses a non-volatile computer tangible medium containing instructions to spawn sweepstakes contests with a variable prize value and a fixed duration within an online computer game. The instructions include an online computer game where players accrue sweepstakes entries. The sweepstakes entries are accrued by playing the online computer game or through an Alternative Method of Entry (AMOE). A cloud-based sweepstakes engine that manages a sweepstakes contest. The cloud-based sweepstakes engine collects sweepstakes entries from players that are entered into the sweepstakes contest through the online computer game. The sweepstakes contest has a fixed duration and a variable prize value that is increased to a higher prize level when an amount of sweepstakes entries reaches a set threshold. The sweepstakes contest is awarded when the fixed duration of the sweepstakes contest expires. The online computer game includes a Graphical User Interface through which users select the amount of sweepstakes entries to push to the sweepstakes engine for entry into the sweepstakes contest. The online computer game is executed on a portable electronic device or a computer terminal. The online computer game is in bi-directional communication with the sweepstakes engine through a distributed computer network. The sweepstakes engine pushes winner information to the online computer game when a winning sweepstakes entry is selected. The sweepstakes engine automatically spawns a new sweepstakes contest for play on the online computer game when the sweepstakes contest is finished and a prize is awarded. The sweepstakes engine automatically generates a set of rules of the new sweepstakes contest from a database of geographic based sweepstakes rules. The sweepstakes engine automatically pushes the set of rules for the new sweepstakes for online publication on a website for sweepstakes contest rules for public viewing. The sweepstakes engine limits access to play the new sweepstakes contest to those online computer games that have an IP address within a geographic area set for the new sweepstakes contest. The sweepstakes entries are selected from the group consisting of electronic tickets, electronic entries, cryptocurrency, Non-Fungible Tokens (NFTs), electronic money, digital currency, or other form of entry. The sweepstakes engine automatically spawns new sweepstakes contests to maintain a constant Return To Player value for players of the online computer game through the sweepstakes contests. The sweepstakes engine records collected sweepstakes entries within a sweepstakes contest blockchain. The sweepstakes contest blockchain is used to award a winner of the sweepstakes contest by randomly selecting a blockchain block from the sweepstakes contest blockchain and naming the player who entered the sweepstakes entry into the selected blockchain block as the winner.

The present specification discloses a non-volatile computer tangible medium containing instructions to spawn sweepstakes contests with a variable prize value and a variable duration within an online computer game. The instructions include an online computer game where players accrue sweepstakes entries. The sweepstakes entries are accrued by playing the online computer game or through an Alternative Method of Entry (AMOE). A cloud-based sweepstakes engine that manages a sweepstakes contest. The cloud-based sweepstakes engine collects sweepstakes entries from players that are entered into the sweepstakes contest through the online computer game. The sweepstakes contest has a fixed initial duration that is accelerated to an earlier date if an amount of sweepstakes entries reaches a set threshold. The sweepstakes contest has a variable prize value that is increased to a higher prize level when an amount of sweepstakes entries reaches a set threshold. The sweepstakes contest is awarded when the amount of sweepstakes entries reaches a set threshold before the fixed initial duration of the sweepstakes contest expires. The sweepstakes contest is awarded when the fixed initial duration expires if the amount of sweepstakes entries does not reach the set threshold. The online computer game includes a Graphical User Interface through which users select the amount of sweepstakes entries to push to the sweepstakes engine for entry into the sweepstakes contest. The online computer game is executed on a portable electronic device or a computer terminal. The online computer game is in bi-directional communication with the sweepstakes engine through a distributed computer network. The sweepstakes engine pushes winner information to the online computer game when a winning sweepstakes entry is selected. The sweepstakes engine automatically spawns a new sweepstakes contest for play on the online computer game when the sweepstakes contest is finished and a prize is awarded. The sweepstakes engine automatically generates a set of rules of the new sweepstakes contest from a database of geographic based sweepstakes rules. The sweepstakes engine automatically pushes the set of rules for the new sweepstakes for online publication on a website for sweepstakes contest rules for public viewing. The sweepstakes engine limits access to play the new sweepstakes contest to those online computer games that have an IP address within a geographic area set for the new sweepstakes contest. The sweepstakes entries are selected from the group consisting of electronic tickets, electronic entries, cryptocurrency, Non-Fungible Tokens (NFTs), electronic money, digital currency, or other form of entry. The sweepstakes engine automatically spawns new sweepstakes contests to maintain a constant Return To Player value for players of the online computer game through the sweepstakes contests. The sweepstakes engine records collected sweepstakes entries within a sweepstakes contest blockchain. The sweepstakes contest blockchain is used to award a winner of the sweepstakes contest by randomly selecting a blockchain block from the sweepstakes contest blockchain and naming the player who entered the sweepstakes entry into the selected blockchain block as the winner.

The present specification discloses a non-volatile computer tangible medium containing instructions to conduct multiple sweepstakes contests through an online computer game to maintain a constant Return To Player (RTP) value for sweepstakes contestants playing through the online computer game. The instructions include generating a sweepstakes contest for a geographic region with a sweepstakes engine by automatically accessing a sweepstakes contest database to create a set of sweepstakes contest rules without human intervention. Next, the instructions push the sweepstakes contest out to online computer games that are operating on a computing device that have an IP address within the geographic region. Sweepstakes contest entries are then accrued that are recorded within the online computer game through either player game play or an Alternative Method of Entry. Sweepstakes contest entries are pushed through a distributed network to the sweepstakes engine for entry into the sweepstakes contest. A winner is selected from the sweepstakes contest entries by having the sweepstakes engine randomly select a winning sweepstakes contest entry when pushed sweepstakes contest entries reach a number threshold that causes the automatic awarding of the sweepstakes contest before an initial sweepstakes contest termination date. A new sweepstakes contest is then automatically generated for a geographic region with a sweepstakes engine by automatically accessing a sweepstakes contest database to create a set of sweepstakes contest rules without human intervention and pushing it out to the online computer games to maintain a constant Return To Player. The constant Return To Player (RTP) is measured by the sweepstakes contest entries accrued within the online computer game and entered into the sweepstakes contests. The sweepstakes contest is allowed to end at a time period ahead of the initial sweepstakes contest termination date based upon sweepstakes entries exceeding a threshold allows for a series of sweepstakes contests to be responsive to fluctuations of player populations sizes and levels of player engagement on the online computer games in order to maintain a constant Return To Player (RTP). The sweepstakes contest databases includes digital information on geographic laws and regulations for mandatory sweepstakes contest rules, prize information, duration information, a threshold for the amount of sweepstakes entries that cause an early termination of the sweepstakes contest, and geographic information on the sweepstakes contest. The sweepstakes engine automatically pushes the sweepstakes contest rules to a website for pushing to allow for public viewing of the sweepstakes contest rules. The sweepstakes contest may have a variable prize level based on the amount of sweepstakes entries received by the sweepstakes engine reaching a threshold before the sweepstakes contest is ended. The sweepstakes contest may have a variable prize level based on a rate at which sweepstakes entries received by the sweepstakes engine surpassing a threshold before the sweepstakes contest is ended allowing for the sweepstakes contest have a variable sweepstakes prize level allows for a series of sweepstakes contests to be responsive to fluctuations of player populations sizes and levels of player engagement on the online computer games in order to maintain a constant Return To Player (RTP).

Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIG. 1 illustrates a pair of graphs depicting the problem of maintaining a constant daily prize payout in view of changing player populations known in the prior art;

FIG. 2 illustrates a pair of graphs depicting an ideal Return To Player (RTP) prize payout for player populations that are growing and declining in size;

FIG. 14 illustrates a sweepstakes entry blockchain in which user's sweepstakes entries are recorded for use in determining the winner of the sweepstakes;

DETAILED DESCRIPTION OF THE SPECIFICATION

Figure 3:
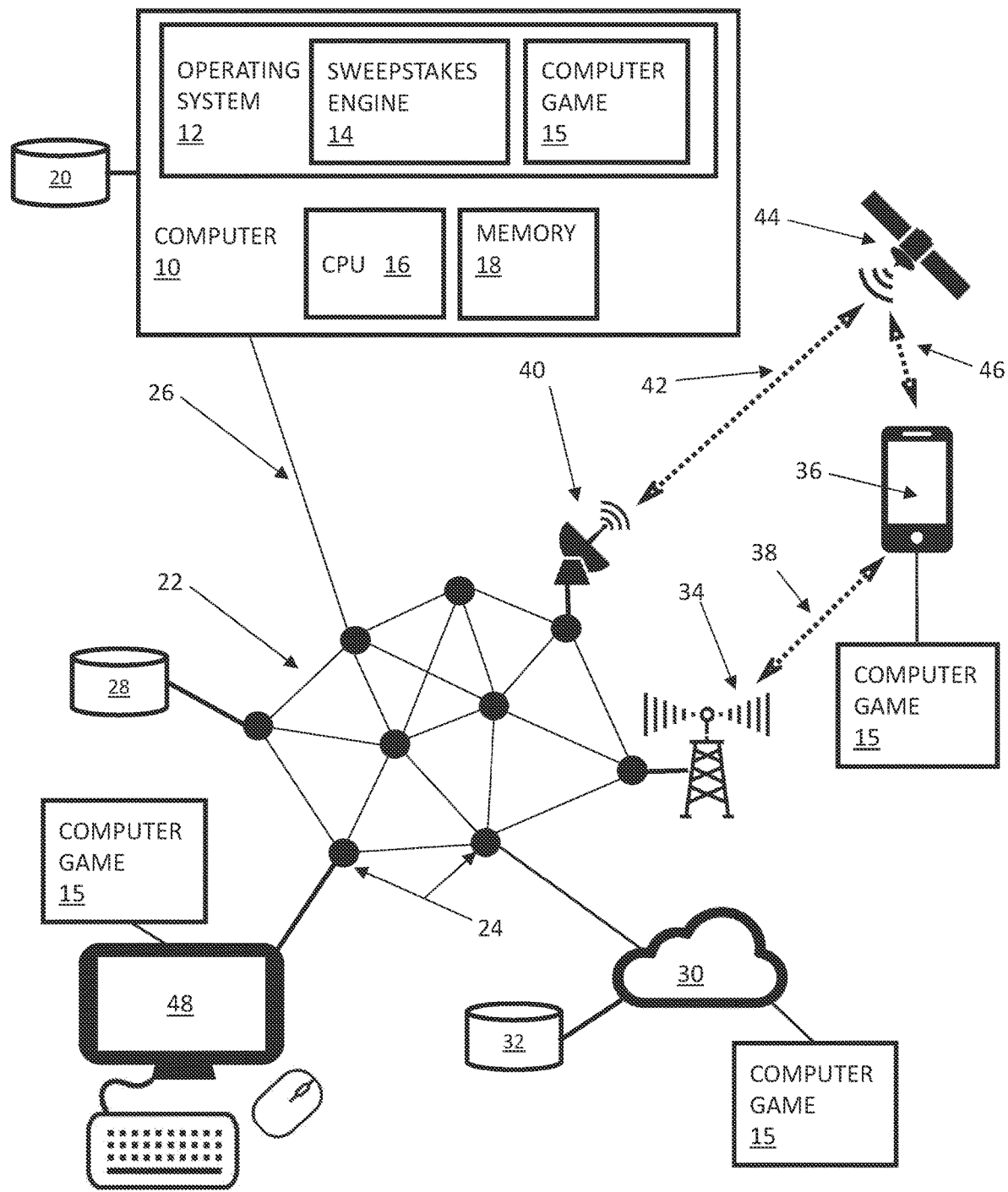
FIG. 3 illustrates a block diagram of a computer system in bi-directional communication with a distributed computer network that is in bi-directional communication with a computer game running on a network terminal, the cloud, and a portable electronic device.

While the invention has been shown and described with reference to a particular embodiment thereof, it will be understood to those skilled in the art, that various changes in form and details may be made therein without departing from the spirit and scope of the invention.

FIG. 1 illustrates a pair of graphs depicting the problem of maintaining a constant daily prize payout in view of changing player populations known in the prior art. A valuable metric in playing games for financial value is the Return To Player (RTP). RTP is a percentage that indicates how much of a game's gross gaming revenue is paid back to its users in the form of promotions or bonuses. RTP is a value that can change significantly based upon varying player populations and player engagement. For example, a game that has a constant player population and constant daily prize payout will also have a constant value for the RTP. However, as shown in the top graph, the RTP will vary based upon player population growth. When a player population grows and the daily prize payout remains constant, the RTP will decrease with increasing population size over time. A decreasing RTP can have a long-term negative impact on the desire of players to participate in a monetary prize game. As player populations increase, the RTP decreases with time making it less desirable for players to engage in that particular game. While increasing player populations may be immediately positive for entities that host the game, long-term decreases in RTP will likely cause a long-term decrease in player populations causing a long-term decline in revenue for the entity hosting the game. A corresponding problem of varying player populations is shown in the lower graph of FIG. 1 where player populations are declining over time. When there is a constant daily prize payout and player populations decline over time, the RTP for that game will increase over time. A game with increasing RTP due to player population decline presents a financial problem for entities that host that game as they are spending more in payouts per player than may be desirable based on the amount players are paying to participate in the game. It is desirable to create games with a stable if not constant RTP to ensure that there are sufficient payouts to keep players engaged with the game, but also a desired amount of RTP so that the entity sponsoring the game can expect a desired financial return. In the field of online computer gaming with sweepstakes prizes, player populations can vary widely based upon the number of users that download a computer game to enter into sweepstakes. Through online downloads of the computer game and game playing through the cloud, online sweepstakes and gaming are subject to enormous variations in player populations making it difficult to maintain a stable value for the RTP. A stable value for the RTP is desirable as a balance to ensure that players can be enticed through a favorable RTP that also ensures that the entity sponsoring the sweepstakes game can remain profitable. Both of the above graphs illustrate the problem of having a variable RTP arising when there is a constant daily prize payout and a varying population of players.

FIG. 2 illustrates a pair of graphs depicting an ideal Return To Player (RTP) prize payout for player populations that are growing and declining in size. Both the top and bottom graphs illustrate how it is possible to create a constant RTP value for both the players of a sweepstakes and for the entity providing the sweepstakes. The two graphs in FIG. 2 show how it is possible to create a constant RTP over time by varying the daily prize payout proportionately to the varying population of players. The top graph shows how increasing the daily prize payout in concert with the increasing number of daily players in a growing player population keeps the RTP value constant over time. Similarly, decreasing the number of daily prize payouts in concert with the decreasing number of daily players also produces a constant RTP over time, as shown in the bottom graph. Varying the daily prize payout in response to the varying population size of players maintains a constant RTP. A constant RTP is valuable to players so that they know going into the game what the statistical prospects are for their financial return in playing, and as such functions as a long-term incentive in attracting and retaining players to the game. In addition, maintaining a constant RTP is valuable for entities that create online games and sweepstakes in that it ensures a profitability level that is predictable in response to varying populations of players that happen regularly due to the wide-open nature of online gaming that may include sweepstakes with massive numbers of player influxes due to sweepstakes going viral, as well as crashes in user populations as the gaming populous goes on to play other games. The present automated sweepstakes engine disclosed in this specification provides a system for conducting online sweepstakes to sweepstakes players in a variety of different methods that maintains a constant RTP over time regardless whether the player populations are increasing, decreasing, or remaining constant.

FIG. 3 illustrates a block diagram of a computer system 10 in bi-directional communication with a distributed computer network 22 that is in bi-directional communication with a computer game 15 running on a network terminal 48, the cloud 30, and a portable electronic device 36. The present specification discloses a computer game 15 configured to run on any display terminal in which the gaming public can login and access the game to play. The computer game 15 can run on any electronic device with a display terminal and a user input device. In this example, computer game 15 runs on a conventional desktop computer 48, which may also be a laptop computer or any other terminal. In this example, desktop computer 48 is shown having a mouse and keyboard. Computer game 15 may also run in the cloud 30 and be accessible by any gaming user with cloud access. Computer game 15 may also run on a portable electronic device 36, which may be a cell phone, a tablet, or any other mobile electronic device. Computer 48 is in direct bi-directional communications with network 22 that includes a plurality of nodes 24. Cloud 30 is in bi-directional communications with network 22 as well as cloud attached storage 32. Mobile device 36 is in bi-directional communications with network 22 through a wireless-communications like 34 and 38, which may be a WiFi connection or a cellular connection such as 4G, LTE, 5G, or 6G, or any other telecommunications technology standard for communication. Mobile device 36 is also in bi-directional communication with network 22 through a satellite communications link 42 and 46 through satellite 44 and satellite receiver 40. Computer 10 is in bi-directional communications with network 22 through link 26. Computer 10 includes an operating system 12, a CPU 16, a memory 18, and attached storage 20. Operating system 12 supports a sweepstakes engine 14 and a computer game 15. Sweepstakes engine 14 automatically generates, maintains, monitors, and awards sweepstakes to users of the computer game 15. Sweepstakes engine 14 collects information from all instances of computer game 15 to configure, create, and launch sweepstakes contests that all of the online gaming community can play through computer game 15 on any of the devices shown in FIG. 3. Sweepstakes engine 14 is in bi-directional communications with all of the instances of computer game 15 through distributed network 22 and its associated communications links. Sweepstakes engine generates new sweepstakes contests based upon the geographic location of players as taken from their IP address of the computer game 15 that they are playing. Sweepstakes engine 14 automatically creates a set of sweepstakes rules for the sweepstakes contest based on an online electronic database of stored laws and regulations required for sweepstakes and online-gaming. Sweepstakes engine 14 then launches the sweepstakes contest to all computer games 15 within the applicable geographic region as sweepstakes and online-contest laws vary between geographic jurisdictions. Users of the computer games 15 can acquire entries through playing the computer game 15. These users can then enter their entries into a sweepstakes contest through their computer game 15. Sweepstakes engine 14 accepts these sweepstakes entries from the users and selects a winner when the sweepstakes contest reaches its conclusion. Sweepstakes engine 14 then informs all of the users through their computer games 15 as to who won the sweepstakes contest. Sweepstakes engine 14 then automatically spawns a new sweepstakes contest and pushes it out to all users of computer game 15.

Figure 4:
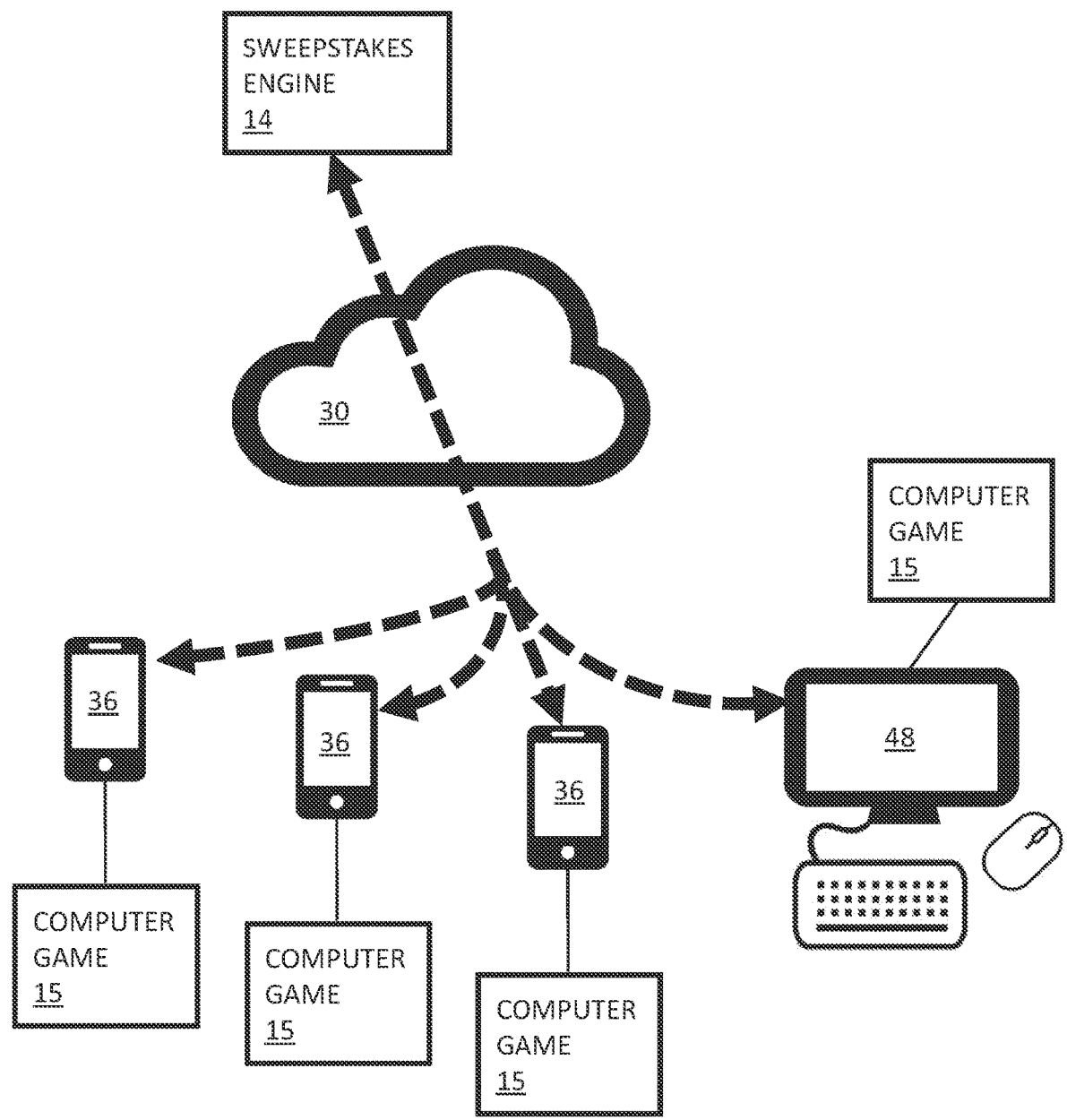
FIG. 4 illustrates a cloud network system in which computer games running on a plurality of portable electronic devices and a computer terminal communicate through the cloud with a sweepstakes engine.

FIG. 4 illustrates a cloud network system 30 in which computer games 15 running on a plurality of portable electronic devices 36 and a computer terminal 48 communicate bi-directionally through the cloud 30 with a sweepstakes engine 14. Sweepstakes engine 14 generates, operates, controls, and awards all gaming sweepstakes contests that users play through their instances of computer game 15 on their portable electronic devices 36 or computer terminal 48, shown with a keyboard and mouse. Computer game 15 may run on any electronic device that is in bi-directional communication with sweepstakes engine 14 through cloud 30. The illustration of cell phones 36 and a desktop computer 48 is merely exemplary. Sweepstakes engine 14 creates a sweepstakes contest that includes general rules on sweepstakes as governed by law, prize amounts, an initial fixed duration, and rules surrounding the amount of entries from individual players. Sweepstakes engine pushes out data on the newly created sweepstakes to all users of the computer game 15 within the geographic region that provides for the sweepstakes based on the IP address of the user's devices. Sweepstakes engine pushes out rules on the sweepstakes to all computer games 15 and a separate rules website accessible to the public. Users then play the computer games 15 to earn entries. Users may acquire and accumulate entries for the sweepstakes through game play or an Alternative Means of Entry (AMOE). Users may then enter a desired amount of entries into the sweepstakes by directing the computer game 15 running on their electronic device to inform the sweepstakes engine 14 of their sweepstakes entries through cloud 30. Sweepstakes engine 14 electronically receives communications from all instances of computer game 15 of sweepstakes entries from users. A variety of parameters may trigger the termination of a sweepstakes which causes the automatic selection of a winner. One of those parameters may be the fixed duration of the sweepstakes contest as required by law. However, to maintain a constant RTP, sweepstakes engine 14 may accelerate the conclusion of the sweepstakes contest if the community of players enter enough entries to trigger a threshold that causes the sweepstakes contest to end at a date before the fixed mandatory contest duration. When the sweepstakes engine 14 determines that the sweepstakes contest is over due to the time period or another terminating trigger event, the sweepstakes then selects a winner from among the entries entered into the sweepstakes contest. The sweepstakes engine 14 then pushes out the winner information to all of the computer games 15 through cloud 30. Sweepstakes engine 14 then creates a new sweepstakes contest automatically and pushes that information out to all instances of computer games 15 within the applicable geographic area based on sweepstakes laws.

Figure 5:
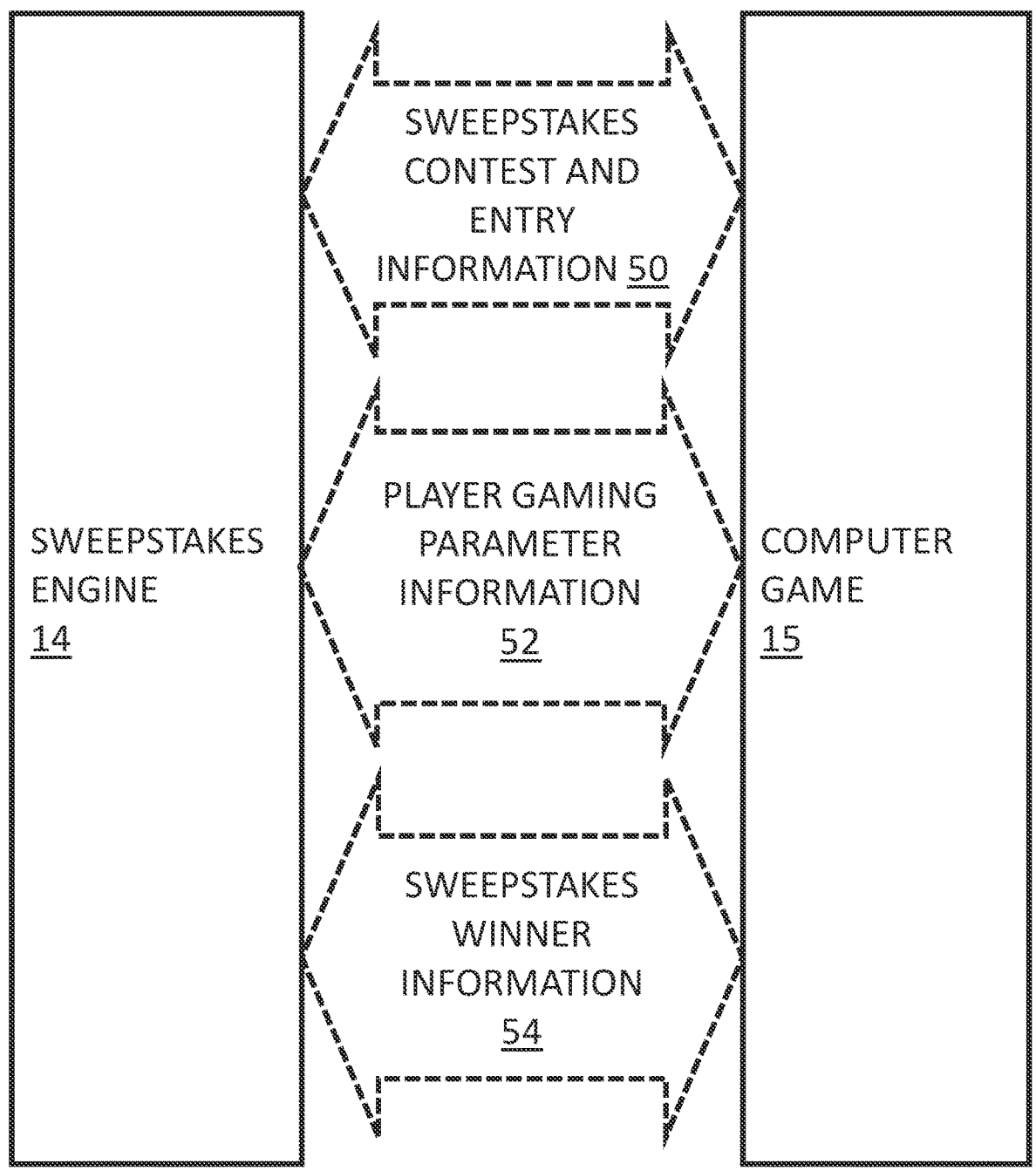
FIG. 5 is a block diagram depicting how a sweepstakes engine communicates with a computer game including communications regarding: sweepstakes contest and entry information; player gaming parameter information; and sweepstakes winner information.

FIG. 5 is a block diagram depicting how a sweepstakes engine 14 communicates with a computer game 15 including communications regarding: sweepstakes contest and entry information 50; player gaming parameter information 52; and sweepstakes winner information 54. In order for a sweepstakes contest to be created, played, and awarded, sweepstakes engine 14 and all instances of computer game 15 must communicate with each other bi-directionally to exchange data and information to create, run, and award a sweepstakes contest. Sweepstakes engine 14 will push out sweepstakes contest information 50 to all instances of computer game 15. Sweepstakes contest information includes all data about a sweepstakes contest including sweepstakes rules as required by law, sweepstakes geographic area, sweepstakes duration, sweepstakes prize, and any other sweepstakes contest information. Sweepstakes contest information also includes all data, media, and software needed to display and run the sweepstakes contest on computer game 15. When the computer game 15 receives all of the sweepstakes contest information 50 from sweepstakes engine 14, computer game 15 configures and runs the sweepstakes contest as a part of the computer game 15 for the game playing user. While playing the game, the user wins entries to enter into the sweepstakes contest. The user may enter one or more entries into the sweepstakes contest by directing computer game 15 to push information on the sweepstakes contest entries 50 to sweepstakes engine 14. During the playing of computer game 15, sweepstakes engine 14 and computer game 15 may be in bi-directional communication with each other on various gaming parameters and other information about the user as collected by the computer game 15. For example, the computer game 15 may monitor the users screen time, engagement with other applications on the mobile device 36, monitor user purchases or ads watched, or any information about the user through the mobile device 36. Computer game 15 may then report on this player gaming parameter information 52 to sweepstakes engine 14 for use in configuring sweepstakes contests. When a sweepstakes contest concludes and a sweepstakes winner is selected, the sweepstakes engine 14 will push out sweepstakes winner information 14 to all instances of the computer game 15 to announce the winner. Sweepstakes engine 14 may then require the sweepstakes winning user to enter various information through the computer game 15 in order to acquire the sweepstakes prize.

Figure 6:
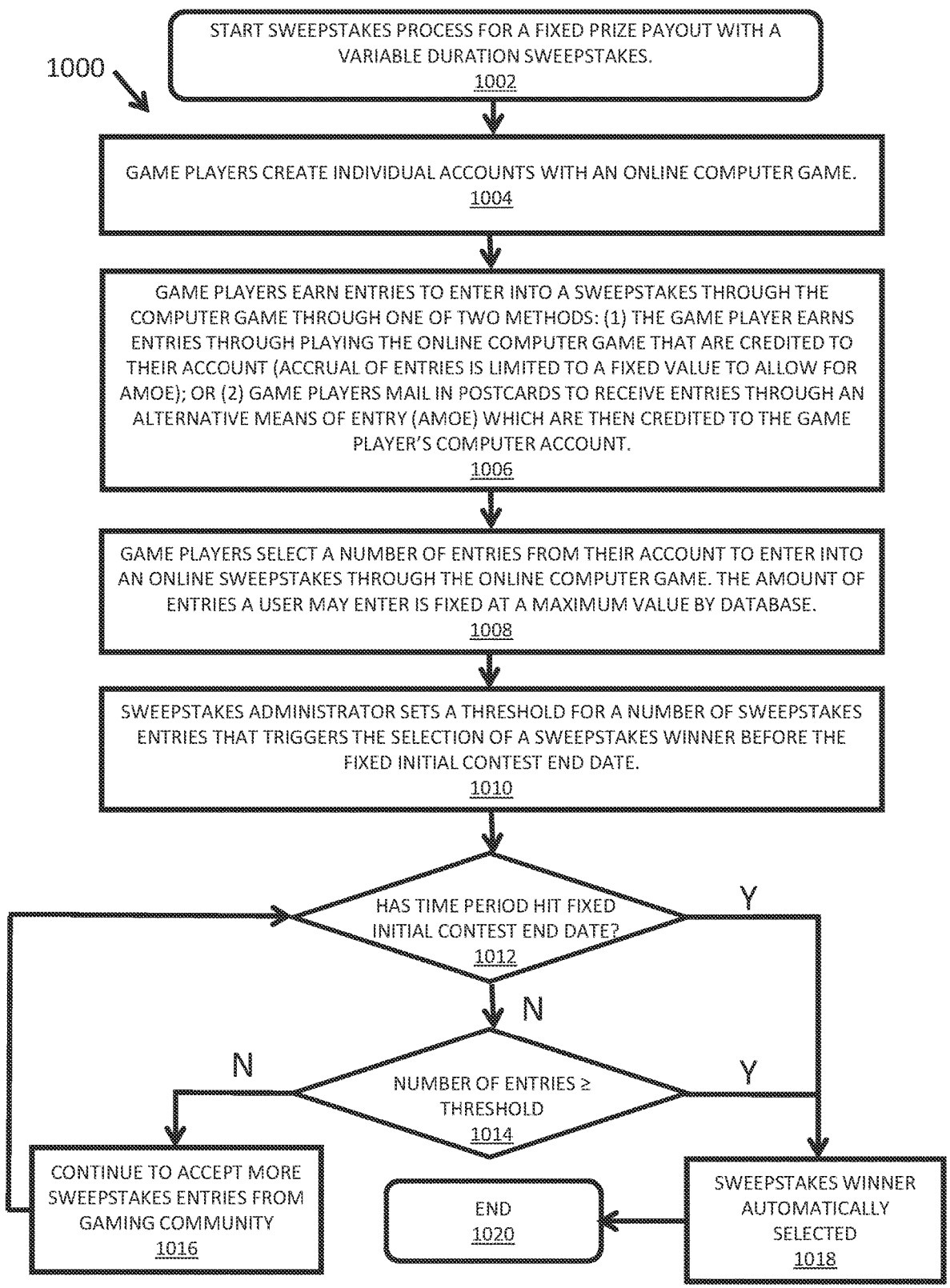
FIG. 6 depicts a flowchart illustrating a process for a sweepstakes contest having a fixed prize payout with a variable duration.

FIG. 6 depicts a flowchart 1000 illustrating a process for a sweepstakes contest having a fixed prize payout with a variable duration. In a preferred embodiment, the sweepstakes engine 14 executes a sweepstakes process according to process 1000. Process 1000 begins with START in step 1002 when the sweepstakes engine starts a process for a fixed prize payout with a variable duration sweepstakes. In step 1004, game players create individual accounts with an online computer game 15 in order to access and play the online sweepstakes through sweepstakes engine 14. In step 1006, game players earn entries to enter into the sweepstakes contest through the computer game by one of two methods. The first method is the game player earns entries through playing the online computer game 15 that are credited to the account. Accrual of entries during a set time period is limited to a fixed value to allow for players to acquire entries through an Alternative Means of Entry (AMOE). Game players may acquire sweepstakes entries through an AMOE, such as mailing in postcards to a sweepstakes manager having a physical post office address. These postcards are then converted to electronic entries that are credited to the game player's online account. Converting postcards into online electronic entries allows for the present online sweepstakes to get awarded immediately after the sweepstakes contest is concluded. Sweepstakes contests that must determine a winner from both electronic entries and physical postcards that are mailed in may take weeks to determine a winner. In contrast, the present sweepstakes engine 14 awards winners based on electronic sweepstakes entries only. However, it is required that sweepstakes provide for an AMOE. The present system accommodates for the AMOE by converting the AMOE into electronic entries that game players may use to enter the sweepstakes. The sole way of directly entering the sweepstakes is through the use of electronic entries that can be earned by either direct game play in computer game 15 or through the AMOE. In step 1008, game players select a number of entries from their account to enter into an online sweepstakes through the online computer game 15. These entries may be game tokens, game points, electronic currency, crypto-currency, Non-Fungible Tokens (NFTs), or any other form of currency, digital token, or point entry system. The amount of entries a user may enter into the sweepstakes is fixed at a maximum value within the database utilized by sweepstakes engine 14 in order to accommodate for the AMOE and keep the sweepstakes winning opportunities available to all users. In step 1010, a sweepstakes administrator sets a threshold for a number of sweepstakes entries that may trigger the conclusion of the sweepstakes early before the fixed initial contest end date. The early triggering of the conclusion of the sweepstakes results in a winner being selected from amongst the entries entered electronically into the sweepstakes contest through computer game 15 into sweepstakes engine 14 through network 22. Allowing for a sweepstakes contest end date than can be accelerated ahead of the fixed sweepstakes contest end date allows for sweepstakes engine 14 to run and launch multiple sweepstakes to maintain a constant RTP for gaming users to maintain player loyalty and interest. Players can control the end date of the sweepstakes contest to an extent by entering more sweepstakes entries to trigger the threshold set by the administrator that causes the sweepstakes to end. This variable end date based on user sweepstakes entries serves as an incentive for game players to play the game to win and enter more entries. Finishing the sweepstakes early based on sweepstakes entries also is responsive to the changing player population. A growing player population that enters correspondingly more entries triggers the sweepstakes faster, allowing for another sweepstakes to then get automatically generated. Thus, this system with a variable prize termination date can maintain a constant RTP for varying player populations. In step 1012, the sweepstakes prize engine looks to determine if the time period for the initial sweepstakes contest end date has expired. If the sweepstakes contest period as initially set has expired, then the sweepstakes engine goes to step 1018 and awards the sweepstakes to a winner and ends the contest in step 1020. However, if the sweepstakes contest period as originally set has not expired, then in step 1014, the sweepstakes engine determines whether the number of sweepstakes entries has hit the threshold specified by the sweepstakes administrator. If the number of entries has not hit the threshold, then in step 1016, the sweepstakes engine continues to accept more entries from the gaming community and the process circles back to step 1012. However, if the number of entries has hit the threshold of entries set by the administrator, then the sweepstakes engine goes to step 1018 and awards the sweepstakes to a winner and ends the contest in step 1020. Process 1000 is able to deliver on a constant RTP with varying player populations as outlined in FIG. 2 based on each player entering a sweepstakes causing the sweepstakes to finish ahead of its fixed initial termination date, thereby spawning a new sweepstakes contest created and pushed out by the sweepstakes engine 14. Varying player population sizes will trigger the termination of the sweepstakes based on entries at different rates, thereby raising or lowering the rate at which sweepstakes last based upon the ability to shorten the sweepstakes period based on the amount of entries from players.

Figure 7:
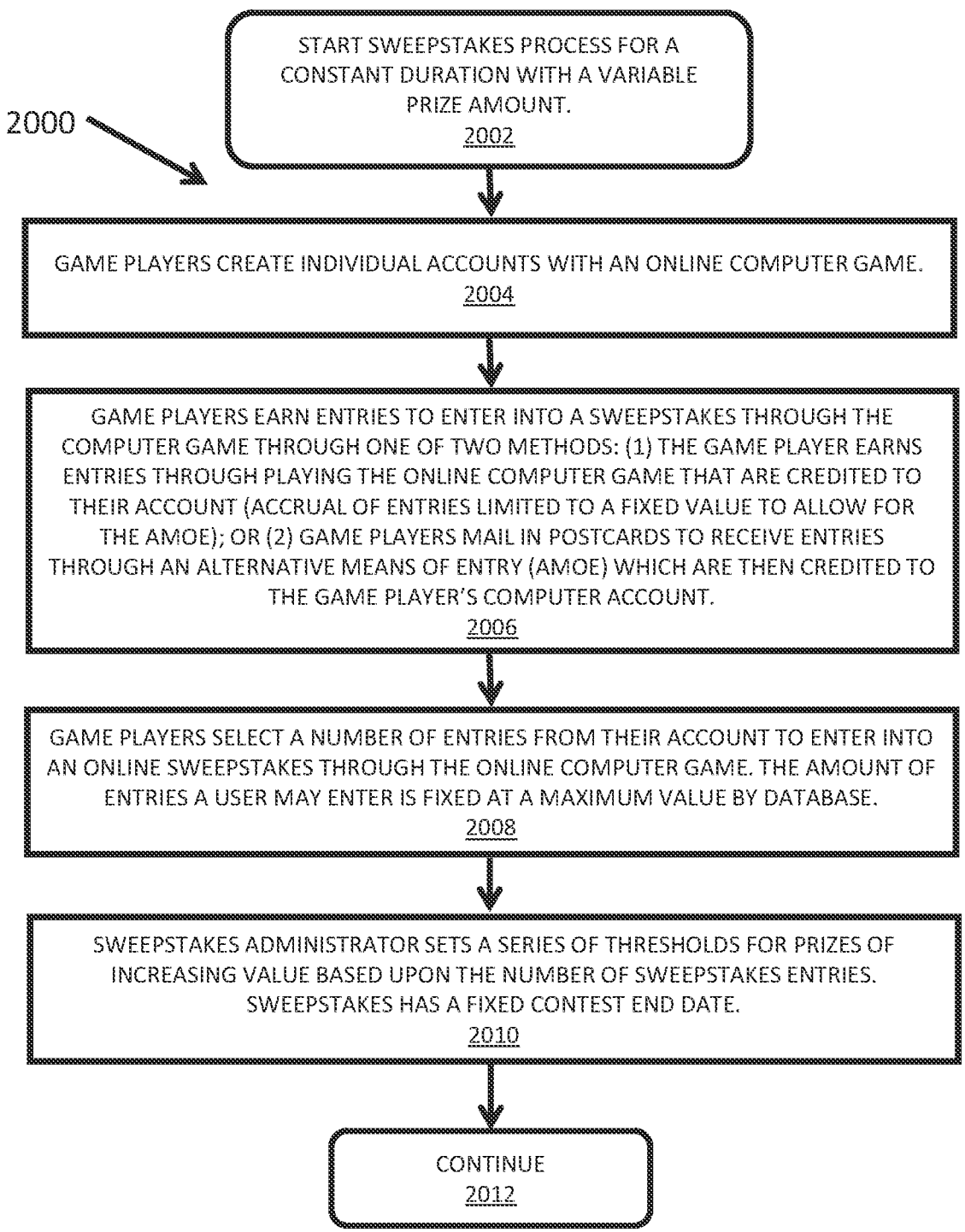
FIGS. 7 and 8 depict a flowchart illustrating a process for a sweepstakes contest having a fixed duration and a variable prize payout.
Figure 8:
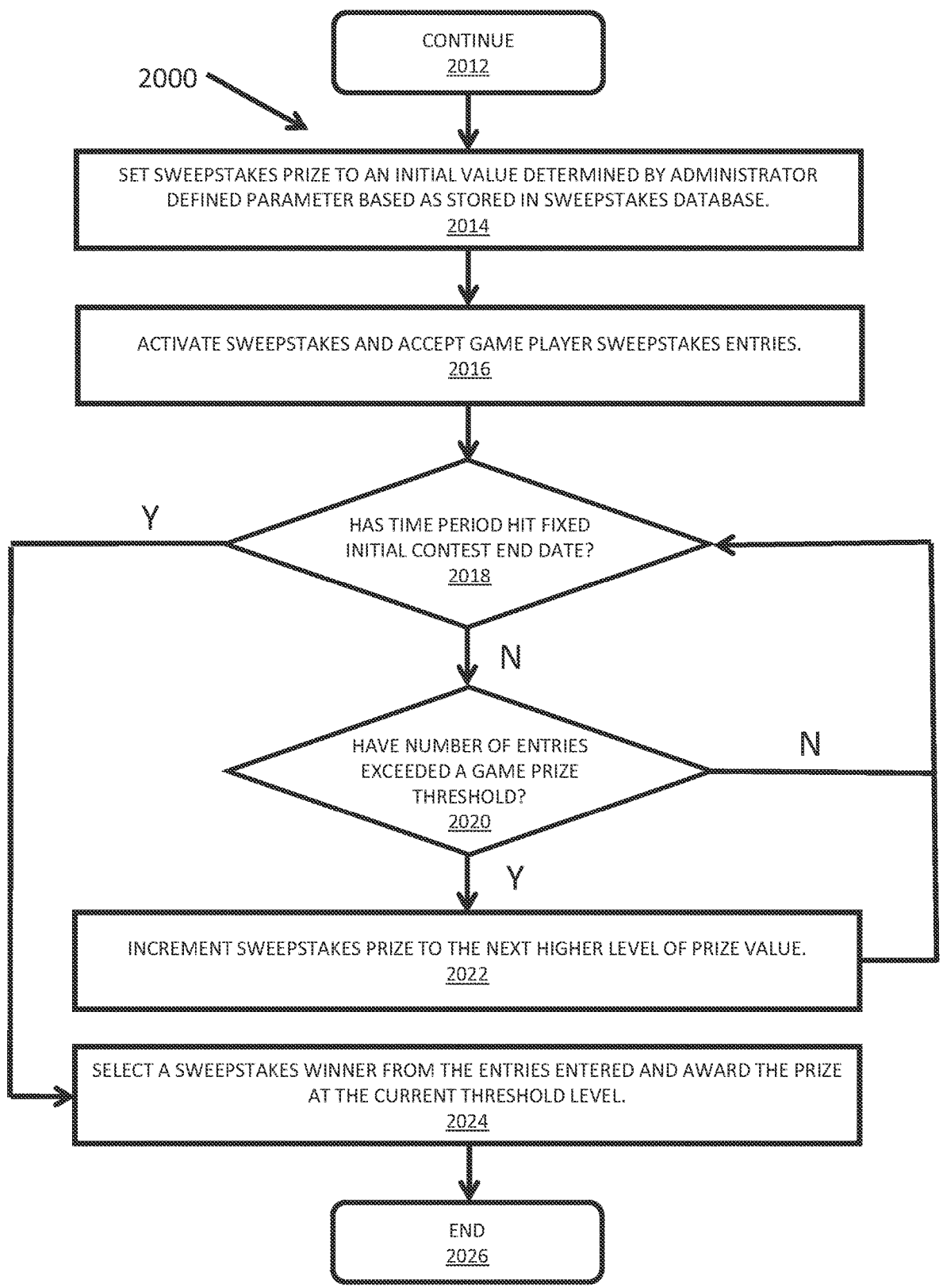

FIGS. 7 and 8 depict a flowchart 2000 illustrating a process for a sweepstakes contest having a fixed duration and a variable prize payout. Another method to deliver on a constant RTP value when dealing with player populations that vary in size over time is through the execution of process 2000 where the sweepstakes contest has a constant duration, but a variable prize payout. In process 2000, increased player engagement has the effect of increasing the value of the prize. When more players enter the sweepstakes contest, the prize increases in value when certain thresholds of entries are met as specified by the sweepstakes administrator. Varying the prize value while keeping the sweepstakes contest duration fixed is another way of creating a constant RTP with varying player populations as outlined in FIG. 2. Process 2000 begins in step 2002 when the sweepstakes engine 14 initiates the process to generate a sweepstakes contest that has a fixed sweepstakes contest duration, but a variable prize payout. In step 2004, game players create individual accounts with an online computer game 15 in order to access and play the online sweepstakes through sweepstakes engine 14. In step 2006, game players earn entries to enter into the sweepstakes contest through the computer game by one of two methods. The first method is the game player earns entries through playing the online computer game 15 that are credited to the account. Accrual of entries during a set time period is limited to a fixed value to allow for players to acquire entries through an Alternative Means of Entry (AMOE). Game players may acquire sweepstakes entries through an AMOE, such as mailing in postcards to a sweepstakes manager having a physical post office address. These postcards are then converted to electronic entries that are credited to the game player's online account. Converting postcards into online electronic entries allows for the present online sweepstakes to get awarded immediately after the sweepstakes contest is concluded. Sweepstakes contests that must determine a winner from both electronic entries and physical postcards that are mailed in may take weeks to determine a winner. In contrast, the present sweepstakes engine 14 awards winners based on electronic sweepstakes entries only. However, it is required that sweepstakes provide for an AMOE. The present system accommodates for the AMOE by converting the AMOE into electronic entries that game players may use to enter the sweepstakes. The sole way of directly entering the sweepstakes is through the use of electronic entries that can be earned by either direct game play in computer game 15 or through the AMOE. In step 2008, game players select a number of entries from their account to enter into an online sweepstakes through the online computer game 15. These entries may be game tokens, game points, electronic currency, crypto-currency, Non-Fungible Tokens (NFTs), or any other form of currency, digital token, or point entry system. The amount of entries a user may enter into the sweepstakes is fixed at a maximum value within the database utilized by sweepstakes engine 14 in order to accommodate for the AMOE and keep the sweepstakes winning opportunities available to all users. In step 2010, a sweepstakes administrator sets a threshold for a number of sweepstakes entries that may trigger the increasing value of the sweepstakes prize. In this embodiment, the sweepstakes contest has a fixed duration set at the beginning of the contest that does not change based on entries from users. These thresholds may, for example, provide for a prize of X value when x amount of entries are entered into the contest and provide a prize of 100X value when 80x amount of entries are entered into the contest. The process continues to FIG. 8 in step 2012. In step 2014 the sweepstakes prize engine 14 sets the sweepstakes contest prize to an initial value determined automatically by the sweepstakes prize engine 14 from the values specified in the sweepstakes database as set by a network administrator. In step 2016, the sweepstakes engine 14 activates the sweepstakes contest for all players in the geographic region on their computer games 15 and accepts player sweepstakes entries. In step 2018, the sweepstakes engine determines if the time period for the fixed duration sweepstakes contest has reached its end date. If it has reached its end date, the process proceeds to step 2024 where the sweepstakes engine 2024 selects a sweepstakes winner from the entries entered and awards the prize at the current threshold level to the winner. The process then ENDS in step 2026 for this particular sweepstakes contest. However, if in step 2018 the sweepstakes contest has not yet hit its final end date, then the process proceeds to step 2020 where the sweepstakes engine determines if the number of sweepstakes entries from the game player community has exceeded a prize threshold. If it has not exceeded a prize threshold, then the process returns to step 2018. However, if there are sufficient entries to trigger a threshold, then the process goes to step 2022 where sweepstakes engine 14 increments the sweepstakes prize to the next higher level of prize value. The sweepstakes engine 14 pushes out the announcement of this advancement to the next higher level of prize to all users of computer game 15 through distributed network 22. The process then continues 20 step 2018 and cycles through until the contest end date is hit in step 2018 triggering the end of the sweepstakes contest and the awarding of the prize in step 2024. By varying the sweepstakes prize level during a fixed duration sweepstakes contest as discussed above, it is possible to create a constant RTP for players and sweepstakes organizers with varying levels of player populations according to FIG. 2.

Figure 9:
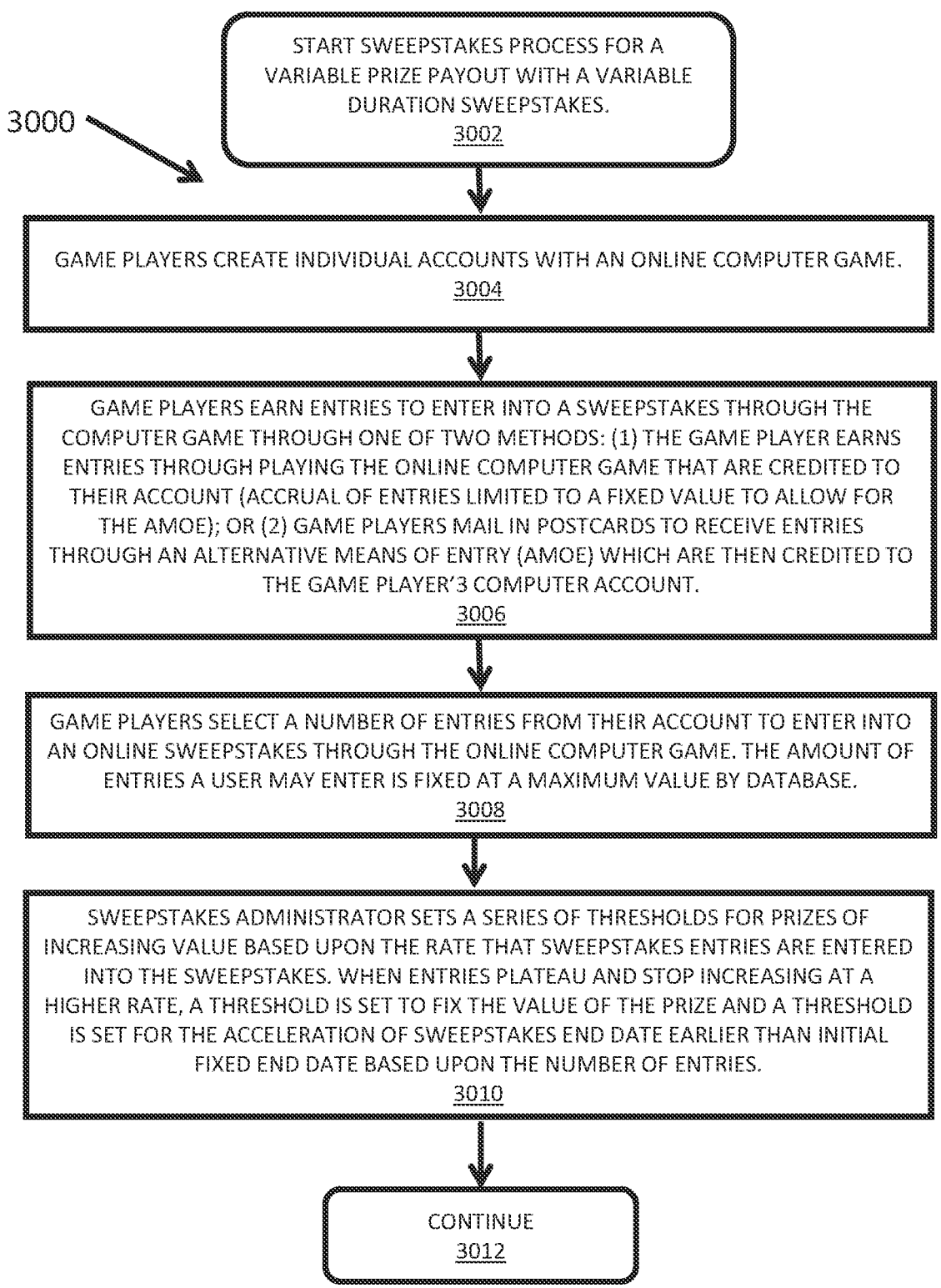
FIGS. 9 and 10 depict a flowchart illustrating a process for a sweepstakes contest having a variable prize payout with a variable duration.
Figure 10:
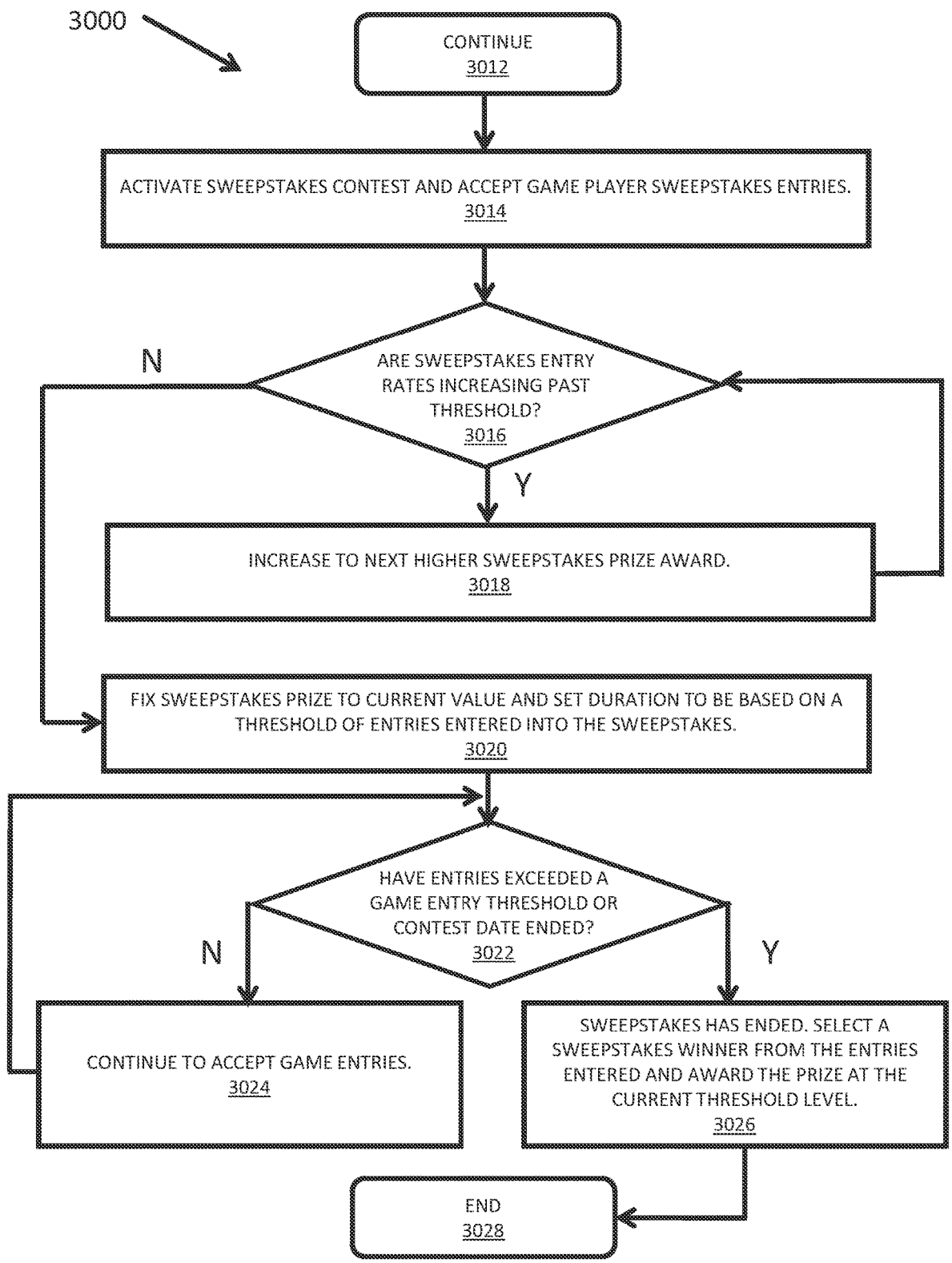

FIGS. 9 and 10 depict a flowchart 3000 illustrating a process for a sweepstakes contest having a variable prize payout with a variable duration. Another way of configuring a sweepstakes prize contest that creates a constant RTP for players and sweepstakes organized with varying levels of player populations according to FIG. 2 is through a sweepstakes contest that has both a variable prize payout and a variable duration. Process 3000 begins in step 3002 when the sweepstakes engine 14 initiates the process to generate a sweepstakes contest that has a variable sweepstakes contest duration and a variable prize payout. In step 3004, game players create individual accounts with an online computer game 15 in order to access and play the online sweepstakes through sweepstakes engine 14. In step 3006, game players earn entries to enter into the sweepstakes contest through the computer game by one of two methods. The first method is the game player earns entries through playing the online computer game 15 that are credited to the account. Accrual of entries during a set time period is limited to a fixed value to allow for players to acquire entries through an Alternative Means of Entry (AMOE). Game players may acquire sweepstakes entries through an AMOE, such as mailing in postcards to a sweepstakes manager having a physical post office address. These postcards are then converted to electronic entries that are credited to the game player's online account. Converting postcards into online electronic entries allows for the present online sweepstakes to get awarded immediately after the sweepstakes contest is concluded. Sweepstakes contests that must determine a winner from both electronic entries and physical postcards that are mailed in may take weeks to determine a winner. In contrast, the present sweepstakes engine 14 awards winners based on electronic sweepstakes entries only. However, it is required that sweepstakes provide for an AMOE. The present system accommodates for the AMOE by converting the AMOE into electronic entries that game players may use to enter the sweepstakes. The sole way of directly entering the sweepstakes is through the use of electronic entries that can be earned by either direct game play in computer game 15 or through the AMOE. In step 3008, game players select a number of entries from their account to enter into an online sweepstakes through the online computer game 15. These entries may be game tokens, game points, electronic currency, crypto-currency, Non-Fungible Tokens (NFTs), or any other form of currency, digital token, or point entry system. The amount of entries a user may enter into the sweepstakes is fixed at a maximum value within the database utilized by sweepstakes engine 14 in order to accommodate for the AMOE and keep the sweepstakes winning opportunities available to all users. In step 3010, a sweepstakes administrator sets a threshold for a number of sweepstakes entries that may trigger the increasing value of the sweepstakes prize based upon the rate of entries from users. These thresholds may, for example, provide for a prize of X value when x amount of entries/day are entered into the contest and provide a prize of 100X value when 80x amount of entries/day are entered into the contest. When the rate of entries plateaus and stops increasing at a higher rate, the value of the sweepstakes prize is fixed and the contest proceeds on a variable duration basis. The sweepstakes contest has an initial duration set during the launch of the sweepstakes. However, a threshold is set where once the sweepstakes contest bits a certain prize value, the end date of the sweepstakes contest may be accelerated to an earlier date based upon the amount of entries entered into the sweepstakes contest. The process continues to FIG. 10 in step 3012. In step 3014 the sweepstakes prize engine 14 sets the sweepstakes contest prize to an initial value and initial duration determined automatically by the sweepstakes prize engine 14 from the values specified in the sweepstakes database as set by a network administrator. The sweepstakes prize engine 14 then activates the sweepstakes contest and pushes the sweepstakes contest information out to all instances of computer game 15 within the applicable geographic area based upon device IP addresses. The sweepstakes engine 14 then accepts prize entries from users across distributed network 22 from computer games 15. In step 3016, the sweepstakes prize engine 14 determines whether sweepstakes entry rates are increasing passed a threshold. If the rate of entries is increasing past a threshold, then the process proceeds to step 3018 where the sweepstakes engine 14 increases the value of the sweepstakes prize to the next highest level and returns to step 3016. Once the sweepstakes entry rates plateau and do not exceed the next threshold level for increasing prize awards, the process proceeds to step 3022. If the number of entries has not exceeded a game entry threshold and the contest date has not ended, then the process proceeds to step 3024 where the sweepstakes continues to accept game entries and returns to step 3022. However, if either the game entries have exceeded the game entry threshold for terminating the sweepstakes contest early, or the original contest end date has been reached, then the process proceeds to step 3026 where the sweepstakes contest has ended. In step 3026, the sweepstakes prize engine selects a winner from the entries entered and awards a sweepstakes prize at the level last determined by steps 3016 and 3018. The sweepstakes engine 14 then announces the sweepstakes prize winner through a push message to all instances of computer game 15 within the geographic area and ends the process in step 3028.

Figure 11:
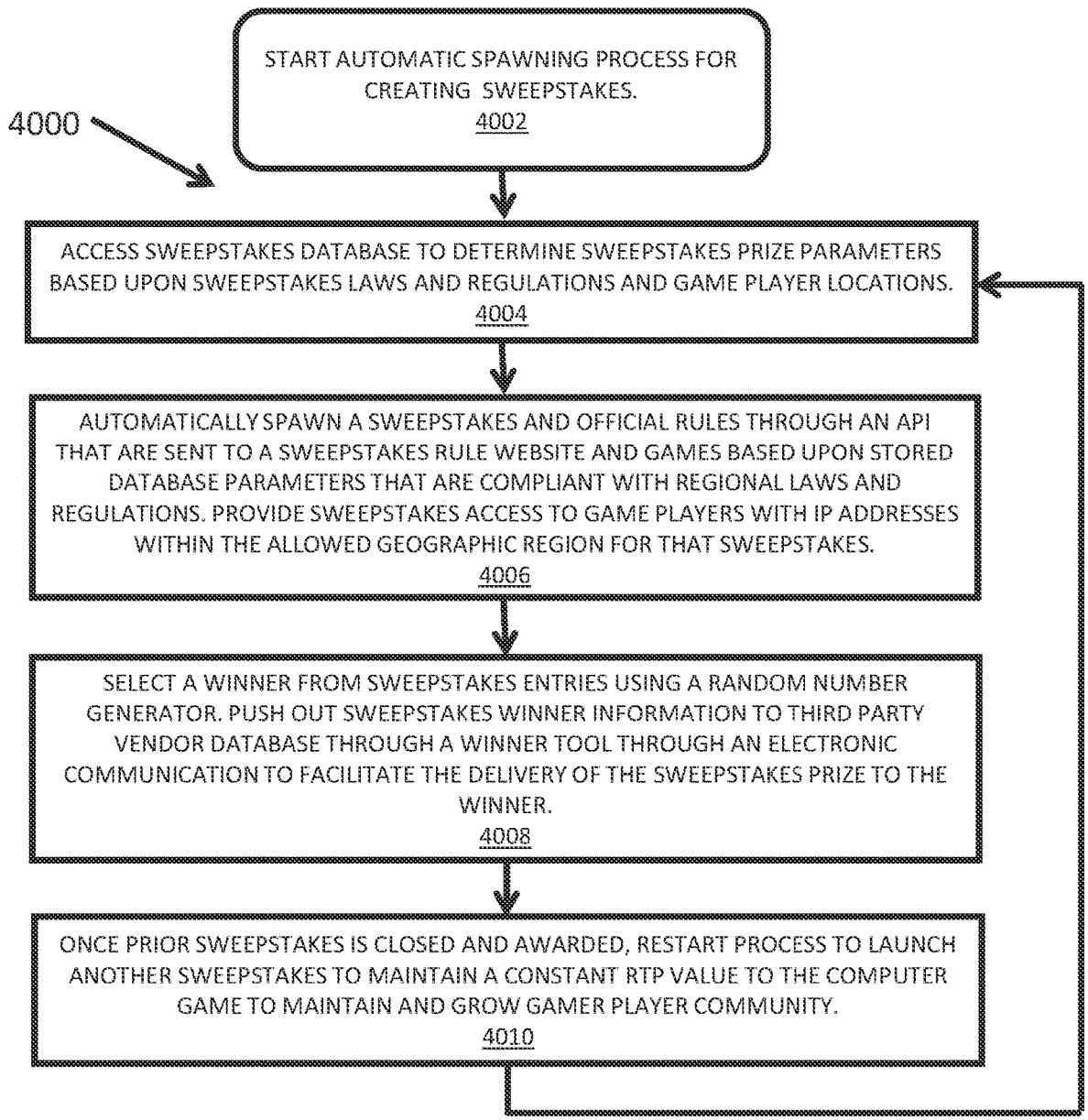
FIG. 11 depicts a flowchart illustrating a process for automatically spawning sweepstakes contests in a computer game.

FIG. 11 depicts a flowchart 4000 illustrating a process for automatically spawning sweepstakes contests in a computer game 15. Processes 1000, 2000, and 3000 are just part of the effort of creating a computer game 15 with a series of sweepstakes that maintain a constant RTP for a population of players that may vary over time. In order to ensure that processes 1000, 2000, and 3000 provide for a constant RTP for a population of players that may vary over time, it is necessary for the sweepstakes engine 14 to spawn new sweepstakes prize contests according to processes 1000, 2000, or 3000 in order to continue to provide a payout game to players as the population of players varies over time. Process 4000 outlines how sweepstakes engine 14 generates a series of sweepstakes contests over time according to processes 1000, 2000, or 3000. The process for automatically spawning successive sweepstakes contests begins with START in step 4002. In step 4004, the sweepstakes engine 14 accesses a sweepstakes rules database to determine all of the parameters and rules of the sweepstakes contest without human intervention. The sweepstakes engine 14 determines whether the sweepstakes will follow process 1000, 2000, or 3000. The sweepstakes engine 14 uses API requests to determine the laws and regulations of the geographic area for the sweepstakes from a database and populates the sweepstakes contest with all required rules and regulations for a legally compliant game. The sweepstakes engine determines the eligible players based upon the IP addresses of their devices hosting the computer game 15. In step 4006, sweepstakes engine 14 automatically spawns a sweepstakes contest according to the official rules determined automatically in step 4004. Sweepstakes engine 14 pushes out the sweepstakes contest information and its official rules to a website where official rules for the sweepstakes are published as well as each computer game 15 that is hosting the contest through distributed network 22. In step 4008, once process 1000, 2000, or 3000 has reached near its end, sweepstakes engine 14 selects a winner from the sweepstakes entries using a random number generator. Sweepstakes engine 14 pushes out the sweepstakes winner information to a third party vendor database through a winner tool through an electronic communication to facilitate delivery of the sweepstakes prize to the winner to outsource the prize delivery process. In step 4010, once the prior sweepstakes contest is closed and awarded, sweepstakes engine 14 restarts the process to launch another sweepstakes to maintain a constant RTP value to computer game 15 sweepstakes contest for the player community to maintain and grow the player community. The new sweepstakes contest may be based on either process 1000, 2000, or 3000 as discussed above.

Figure 12:
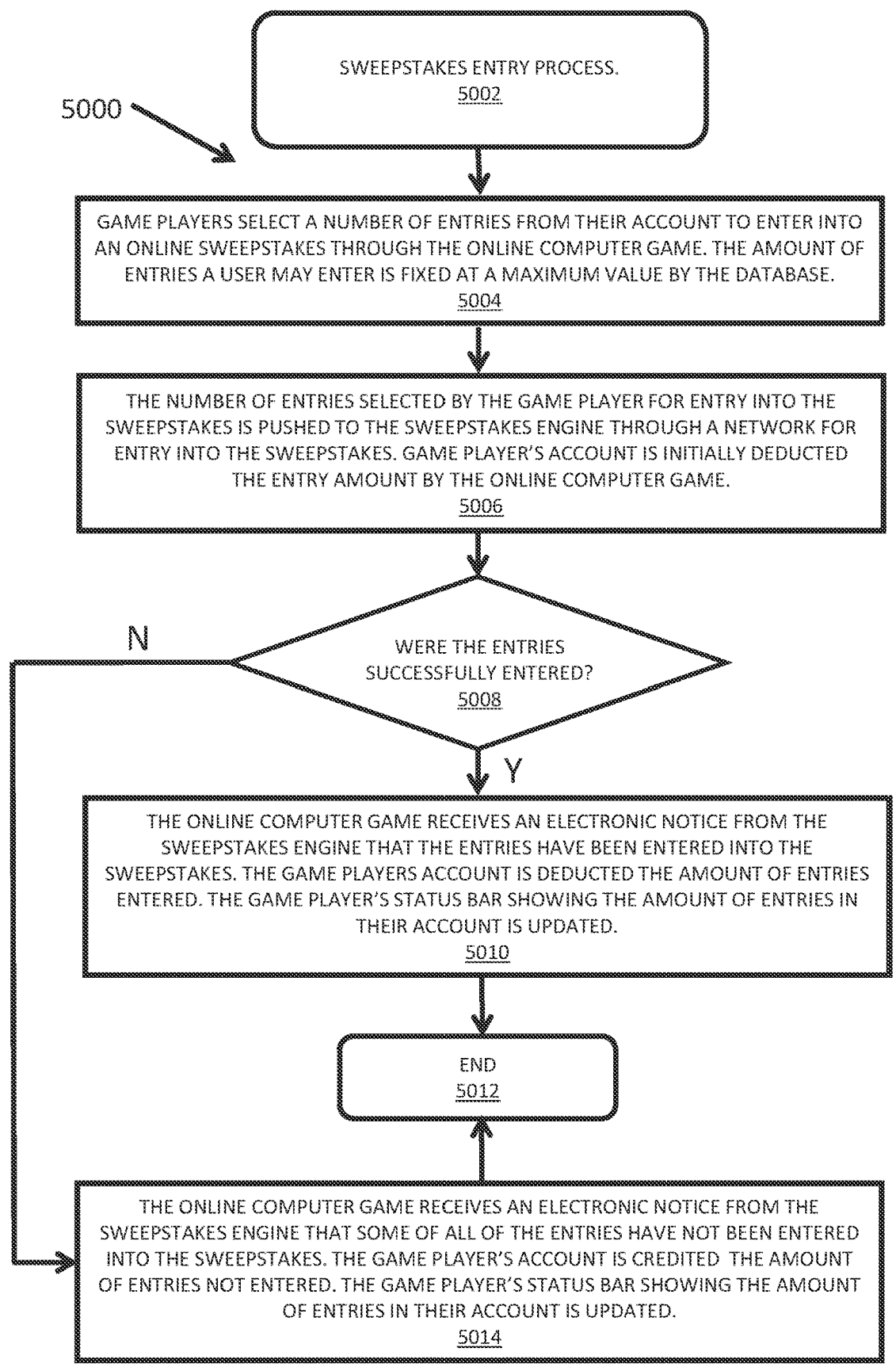
FIG. 12 depicts a flowchart illustrating a process for a gaming player to enter entries into a sweepstakes contest through the computer game.

FIG. 12 depicts a flowchart 5000 illustrating a process for a gaming player to enter entries into a sweepstakes contest through the computer game 15. Process 5000 outlines the method by which an individual game player enters entries into a sweepstakes contest managed by sweepstakes engine 14 through computer game 15. The process begins with START in step 5002. In step 5004, a game player selects a number of ticket entries from their online computer game account to enter into an online sweepstakes contest through their computer game GUI 15. The amount of entries a user may enter is fixed at a maximum value by the database to facilitate an AMOE as well as maintain contest balance amongst players. In step 5006, the number of entries selected by the game player for entry into the sweepstakes is pushed to the sweepstakes engine 14 by computer game 15 through a network 22 for entry into the sweepstakes. The game player's account on computer game 15 is initially deducted the entry amount by the online computer game 15. In step 5008, computer game 15 determines if the entries were successfully entered into the sweepstakes contest by sweepstakes engine 14. If the entries were successfully entered into the sweepstakes contest, the process proceeds to step 5019 where the computer game 15 receives an electronic notice from the sweepstakes engine 14 that the entries have been entered into the sweepstakes. The amount of entries entered is deducted from the game player's account. The game player's status bar on the GUI of their computer game 15 is updated showing the amount of entries that they currently have as well as the amount of entries entered into the contest. The process of entering entries then ENDS in step 5012. However, it is possible that the sweepstakes engine 14 did not enter some or all of the entries submitted by the game player in step 5008. For example, reasons for not entering a entry may include an electronic miscommunication. Alternatively, the sweepstakes contest period may have ended, or a threshold of entries may have caused the termination of the sweepstakes based upon some of the entries from the game player. In this event, in step 5014, the sweepstakes engine pushes out a notice to the computer game 15 that some or all of the entries were not entered into the sweepstakes. The game player's account is credited the amount of entries not entered. The game player's status bar showing the amount of entries in their account is then updated. The process then ENDS in step 5012.

Figure 13:
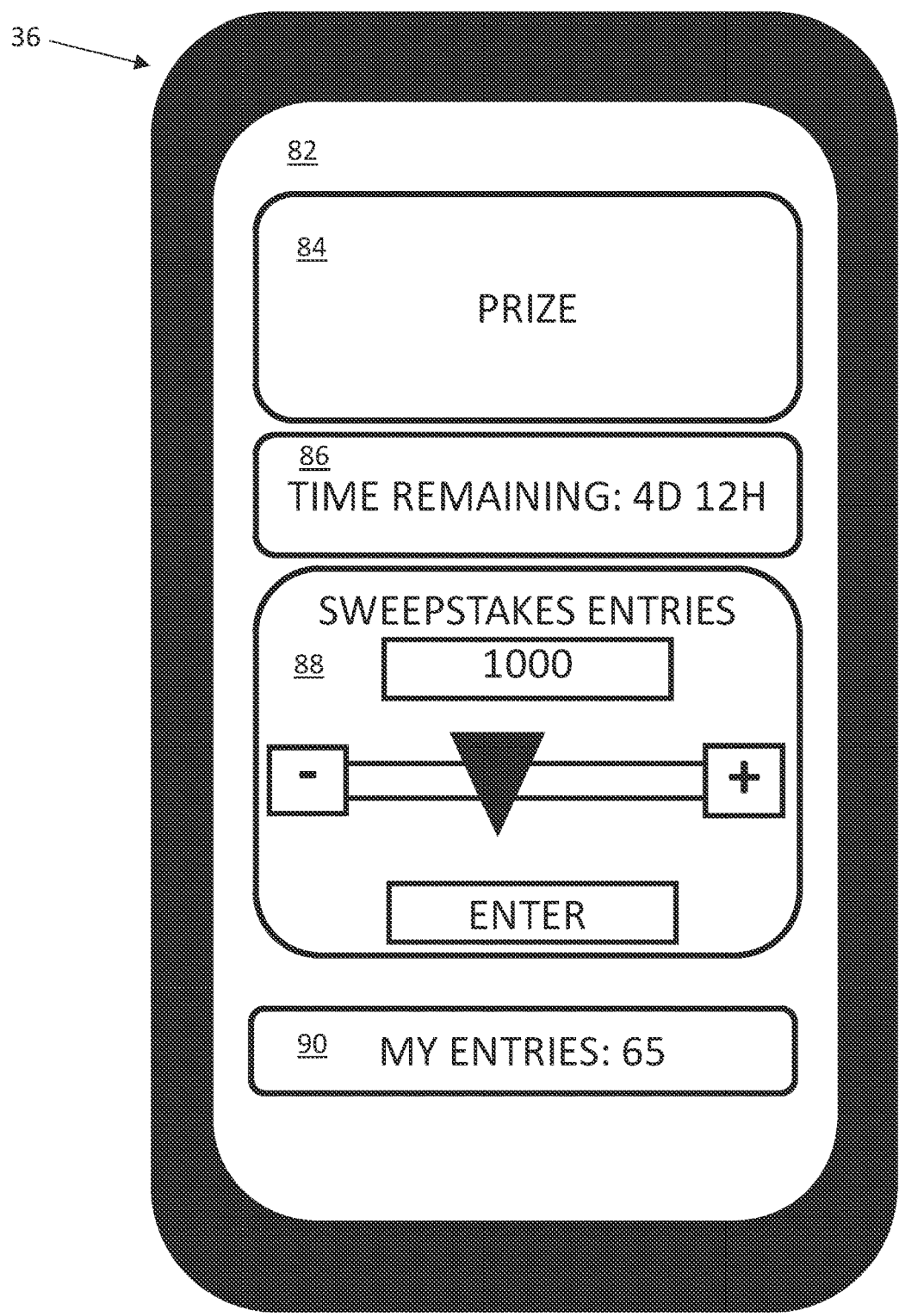
FIG. 13 depicts a graphical user interface on a portable electronic device in which a user may select a number of entries to enter into a sweepstakes.

FIG. 13 depicts a Graphical User Interface (GUI) 82 on a portable electronic device 36 in which a user may select a number of entries to enter into a sweepstakes contest. Computer game 15 is manifested on an electronic device 36 or 48 through a GUI 82. FIG. 13 shows GUI 82 on a portable electronic device 36 like a cell phone. GUI 82 includes a display section 84 showing a prize that is the subject of the sweepstakes contest. In display section 86, the remaining time duration of the sweepstakes contest is shown, in this case 4 days and 12 hours. GUI section 88 shows that the game player has 1000 sweepstakes entries. Using a sliding bar to select a number of entries, GUI section 90 shows that the user has selected 65 entries for the current sweepstakes contest. Once the user hits the ENTER button in GUI section 88, computer game 15 then pushes the number of 65 entries out to sweepstakes engine 14 for entry into the sweepstakes contest pursuant to process 5000.

FIG. 14 illustrates a sweepstakes entry blockchain 56 in which user's sweepstakes entries are recorded for use in determining the winner of the sweepstakes. A blockchain data technology may be utilized by sweepstakes engine 14 to record entries into the sweepstakes contests. For example, a genesis blockchain block 58 may be created when sweepstakes engine 14 spawns a new sweepstakes contest Genesis blockchain block 58 may record all sweepstakes information related to that contest. Succeeding blockchain blocks 60 and 62 may then record entries from users into the sweepstakes contest. A final blockchain block 64 may then be created when the sweepstakes contest is completed. The final blockchain block 64 may include all final information on the sweepstakes including the identity of the winning entry and the winning user, as well as the information related to the prize award and delivery of the prize to the user. The illustration of a blockchain 56 formed of four blockchain blocks 58, 60, 62, and 64 is merely exemplary for illustrative purposes owing to the size of the page. It is contemplated that blockchain 56 may be formed of any number of blockchain blocks recording sweepstakes entries from users. In this example, sweepstakes entry blockchain genesis blockchain block includes all information on the rules and parameters of the sweepstakes contest as automatically generated by sweepstakes prize engine according to process 4000. The information in genesis block 58 includes sweepstakes metadata such as the ID number of the contest, start date, regulatory information, contest rules. The blockchain data includes sweepstakes contest data information such as the contest duration, prize value, regulatory information, contest rules, and thresholds triggering different prize awards or an accelerated termination date. Blockchain metadata includes a metadata wrapper and a hash digest of blockchain block 58. Sweepstakes entry data blockchain block 60 includes information on a block of entries into the sweepstakes. Blockchain block 60 includes as data the entry ID of the entries, the game player ID of the player who entered the entries, the IP address of the game player's device for regulatory purposes, and the number of entries entered into the contest. The blockchain metadata includes a metadata wrapper, a hash digest from blockchain block 58, and a hash digest of blockchain block 60. Sweepstakes entry data blockchain block 62 includes information on a block of entries into the sweepstakes. Blockchain block 62 includes as data the entry ID of the entries, the game player ID of the player who entered the entries, the IP address of the game player's device for regulatory purposes, and the number of entries entered into the contest. The blockchain metadata includes a metadata wrapper, a hash digest from blockchain block 60, and a hash digest of blockchain block 62. Sweepstakes winning data blockchain block 64 records the data on the awarding of the sweepstakes prize to a winning entry and winning game player. Blockchain block 64 is the terminating blockchain block that ends the blockchain for this contest prize blockchain 56. The blockchain data includes the ID of the winning entry, ID of the winning player, IP address information on the winning player's device, and winning selection information. The blockchain metadata includes a metadata wrapper, a hash digest from blockchain block 62, and a hash digest of blockchain block 64.

Figure 15:
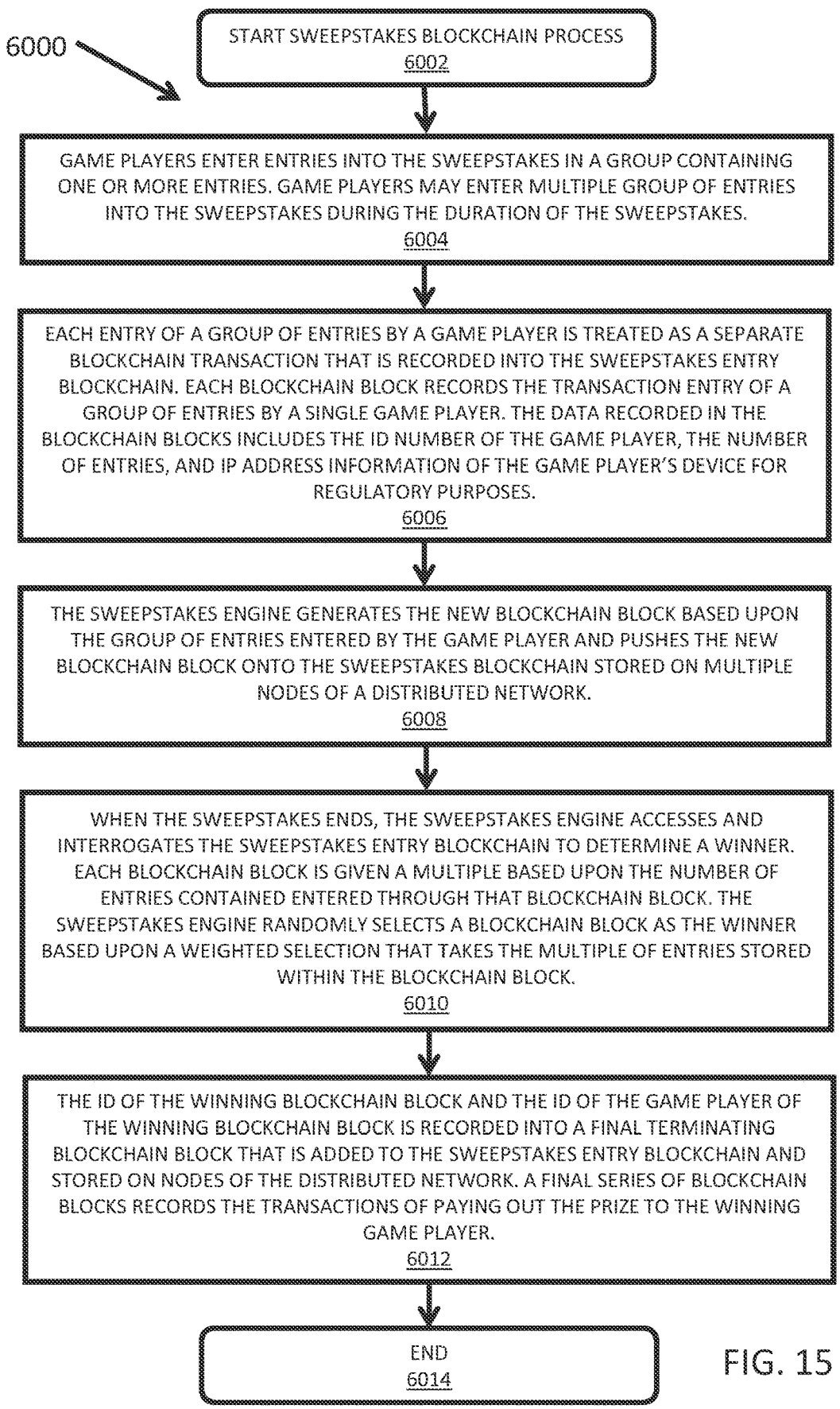
FIG. 15 depicts a flowchart illustrating a blockchain process for accepting sweepstakes entries and selecting a sweepstakes winner.

FIG. 15 depicts a flowchart 6000 illustrating a blockchain process for accepting sweepstakes entries and selecting a sweepstakes winner based upon a blockchain illustrated in FIG. 14. The process 6000 begins with START in step 6002. In step 6002, spawning a new sweepstakes contest in process 4000 causes the generation of a new blockchain 56 for that particular sweepstakes including a genesis blockchain block 58 with all information on that particular sweepstakes contest. In step 6004, game players enter entries into the sweepstakes contest in a group containing one or more entries. Game players may enter multiple groups of entries into the sweepstakes during the duration of the sweepstakes. In step 6006, each entry of a group of entries by a game player is treated as a separate blockchain transaction that is recorded into the sweepstakes entry blockchain. Each blockchain transaction records the transaction entry of a group of entries by a single game player. The data recorded in the blockchain blocks 60 and 62 includes the ID number of the game player, the number of entries, and IP address information on the game player's device for regulatory purposes. In step 6008, the sweepstakes engine generates new blockchain blocks 60 or 62 based upon the group of entries entered by the game player and pushes the new blockchain blocks 60 or 62 onto the sweepstakes blockchain 56 that is stored on multiple nodes 24 of distributed computer network 22. In step 6010, when the sweepstakes contest ends, the sweepstakes engine 14 accesses and interrogates sweepstakes blockchain 56 to determine a winner. Each blockchain block 60 and 62 is given a multiple based upon the number of entries submitted as a group that were recorded in that blockchain block. The sweepstakes engine 14 randomly selects a blockchain block 60 or 62 that is a winner based upon a weighted selection that takes the multiple of entries stored within the blockchain block into account. In step 6012, the ID of the winning blockchain block and the ID of the game player of the winning blockchain block is recorded into a final terminating blockchain block 64 that records the completion and awarding of the sweepstakes prize. This final terminating blockchain block 64 is generated by sweepstakes engine 14 and pushed onto blockchain 56 stored on distributed network 22. An additional final series of blockchain blocks may record the transactions of paying out the prize to the winning game player. The length of sweepstakes blockchain 56 is finite as it is limited to a single sweepstakes game. The process then ENDS in step 6014.

Figure 16:
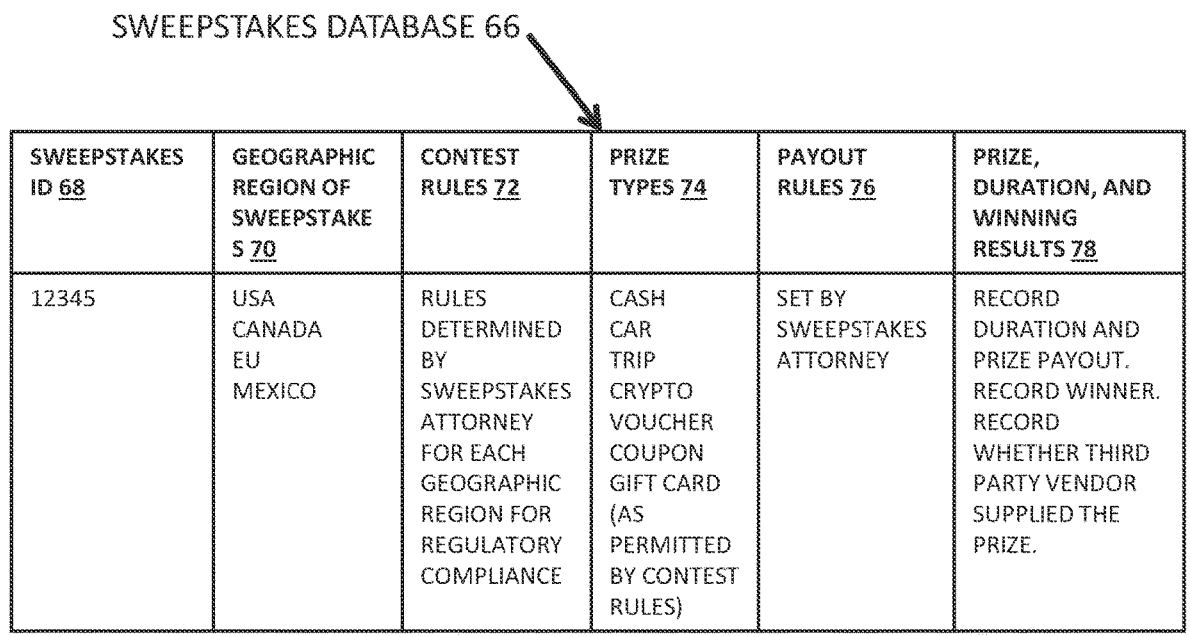
FIG. 16 illustrates an exemplary database table for a sweepstakes database.

FIG. 16 illustrates an exemplary database table for a sweepstakes database 66. Sweepstakes database 66 includes all information on sweepstakes that enables sweepstakes engine 14 to automatically generate and spawn new sweepstakes contests without human intervention. Column 68 lists the ID number of each sweepstakes. Column 70 lists that geographic region of each sweepstakes. Column 72 lists the contest rules of each sweepstakes. Contest rules are determined by a sweepstakes attorney for each geographic region for regulatory compliance and entered into the database so that sweepstakes engine 14 can automatically select the right rules based on the geographic region of the sweepstakes contest. Column 74 lists the prize types for the sweepstakes contest, such as for example cash, cars, boats, trips, cryptocurrency, vouchers, coupons, gift cards, or any other prize of monetary value. Column 76 lists payout rules as set by a sweepstakes attorney. Column 78 lists the prize, duration, and winning results of each sweepstakes contest. Other columns not shown may list any other relevant information related to the automatic generation of a sweepstakes contest by sweepstakes engine 14.

Figure 17:
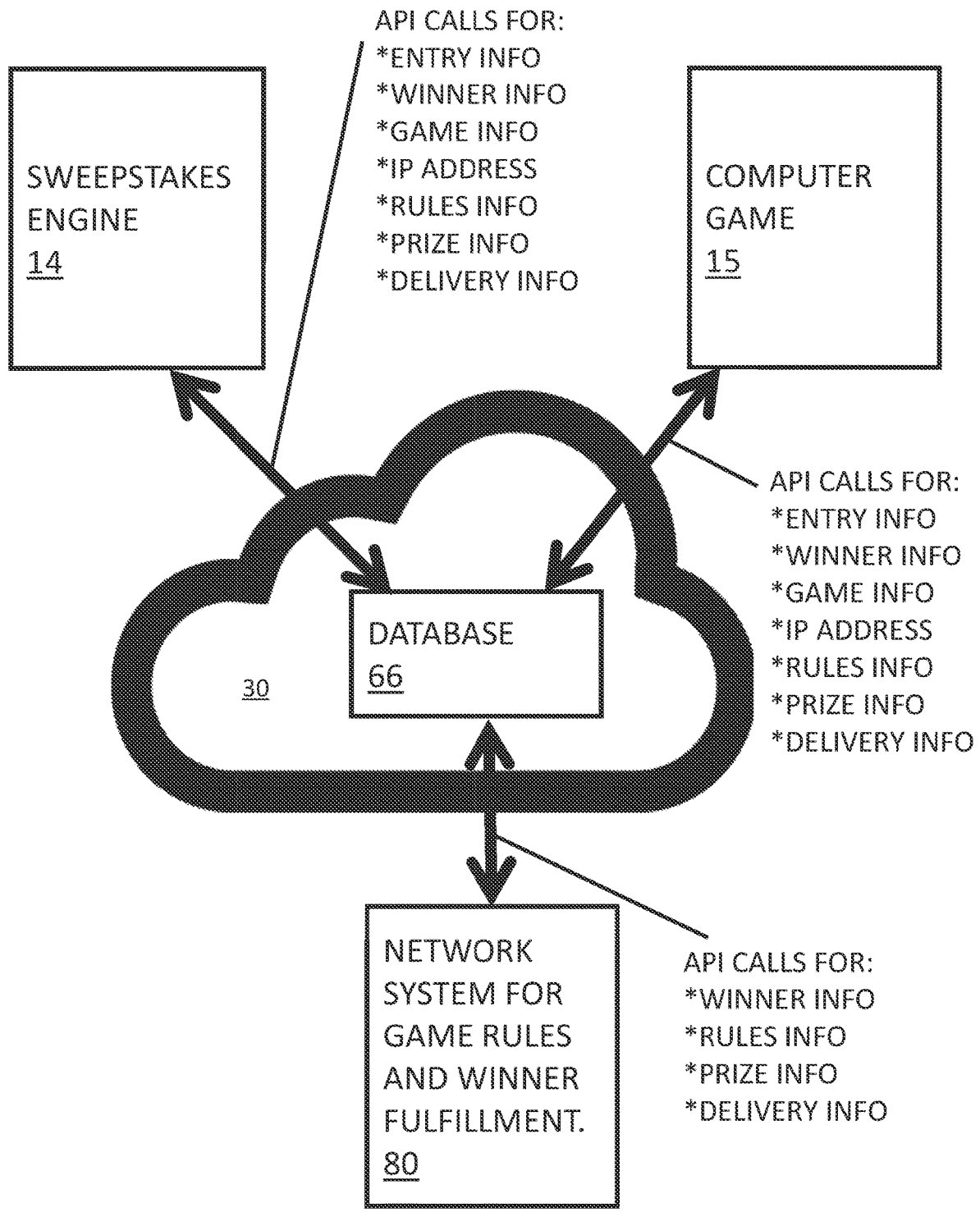
FIG. 17 illustrates how the sweepstakes database interacts with computer games, the sweepstakes engine, and a network system for game rules and winner fulfillment through API calls.

FIG. 17 illustrates how the sweepstakes database 66 interacts with computer games 15, the sweepstakes engine 14, and a network system 80 for game rules and winner fulfillment through API calls. Sweepstakes engine 14 communicates with database 66 through cloud 30. Sweepstakes engine 14 may utilize API calls to database 66 for sweepstakes entry information, winning entry information, game information, IP address information, rules information, prize information, prize delivery information, and any other sweepstakes contest information stored within database 66. Computer game 15 communicates with database 66 through cloud 30. Computer game 15 may utilize API calls to database 66 for sweepstakes entry information, winning entry information, game information, IP address information, rules information, prize information, prize delivery information, or any other information related to the computer game or the sweepstakes contest. A network system for game rules and winner fulfillment 80 may communicate with database 66 through cloud 30. Network system 80 may utilize API calls to database 66 for winning game player information, rules information, prize information, prize delivery information, and any other information related to the sweepstakes prize contest.

Figure 18:
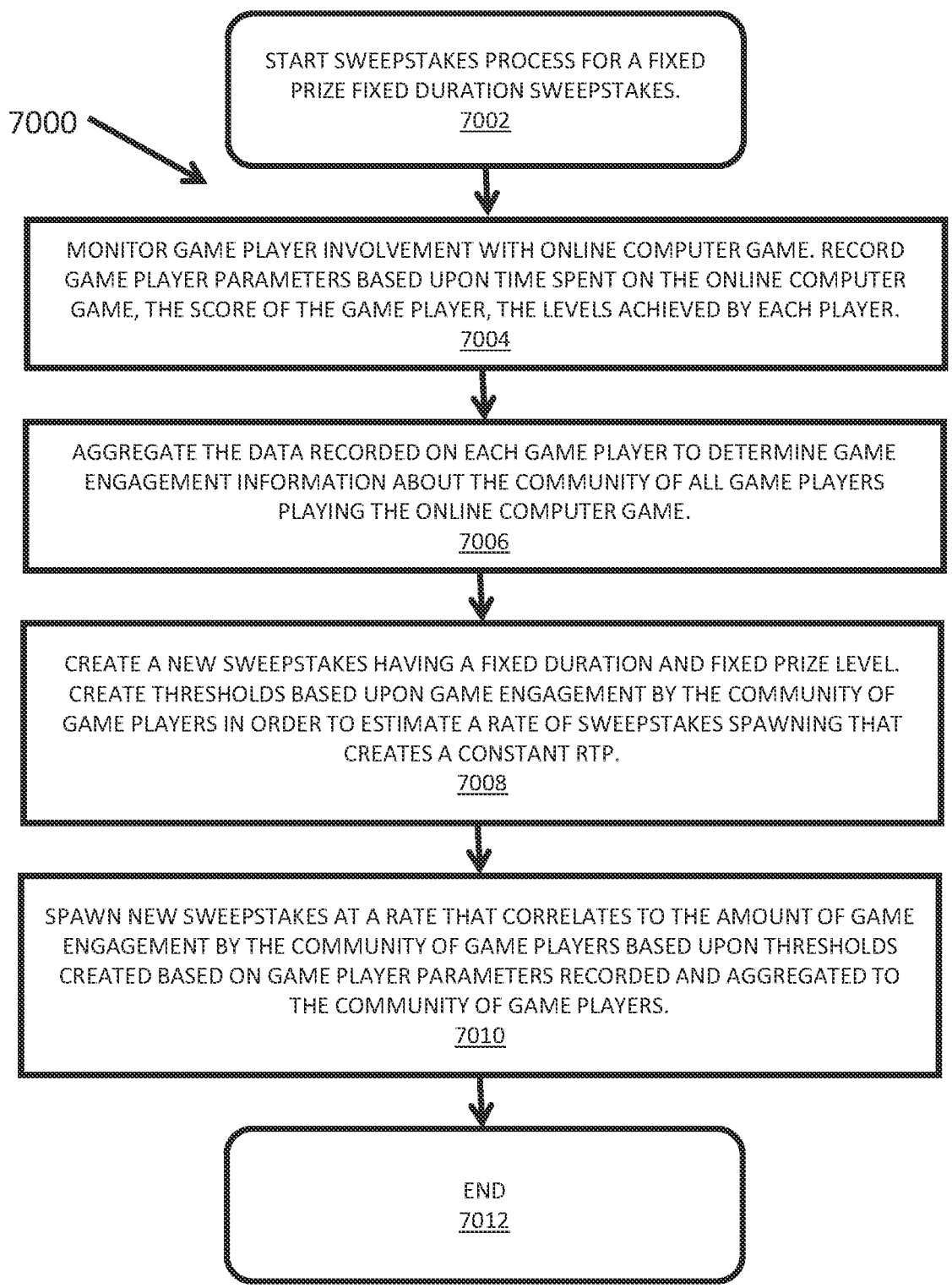
FIG. 18 illustrates a sweepstakes process for a fixed prize and fixed duration sweepstakes that tries to achieve a constant Return To Player (RTP) by estimating the amount of game player engagement with the game through various parameters.

FIG. 18 illustrates a sweepstakes process 7000 for a fixed prize and fixed duration sweepstakes that tries to achieve a constant Return To Player (RTP) by estimating the amount of game player engagement with the game through various parameters. Processes 1000, 2000, and 3000 achieve a constant RTP by directly measuring player engagement and player population through the amount of sweepstakes entries for each given sweepstakes. Process 7000 is a fundamentally different process for achieving a constant RTP by using sweepstakes of fixed prize values and fixed durations. Sweepstakes with fixed prizes and fixed durations are non-responsive to gaming communities that have time varying player populations. However, in process 7000, the sweepstakes engine monitors various game player parameters to estimate a level of player engagement and player population to spawn sweepstakes at varying rates to create a constant RTP for time varying game player populations. The process begins with START in step 7002. In step 7004, the sweepstakes engine 14 monitors game player involvement with the computer game across all instances of the computer game 15. The sweepstakes engine 14 records the number of players and the game player's involvement with each game include time on the game, levels achieved, the player's game score, and other game playing parameters. In step 7006, sweepstakes engine 14 aggregates the data on the game player engagement parameters to determine a level of game engagement and game engagement information about the community of all game players playing the computer game. In step 7008, the sweepstakes engine then creates a new sweepstakes contest of fixed value and fixed duration. The sweepstakes engine is then programmed with thresholds based upon game engagement by the community of game players in order to estimate a rate of spawning new sweepstakes games that creates a constant RTP. In step 7010, the sweepstakes engine then spawns new sweepstakes games at a rate that correlates to the amount of game engagement by the community of game players based on thresholds created on game player parameters recorded and aggregated to the community of game players. The process then ENDS in step 7012.

Figure 19:
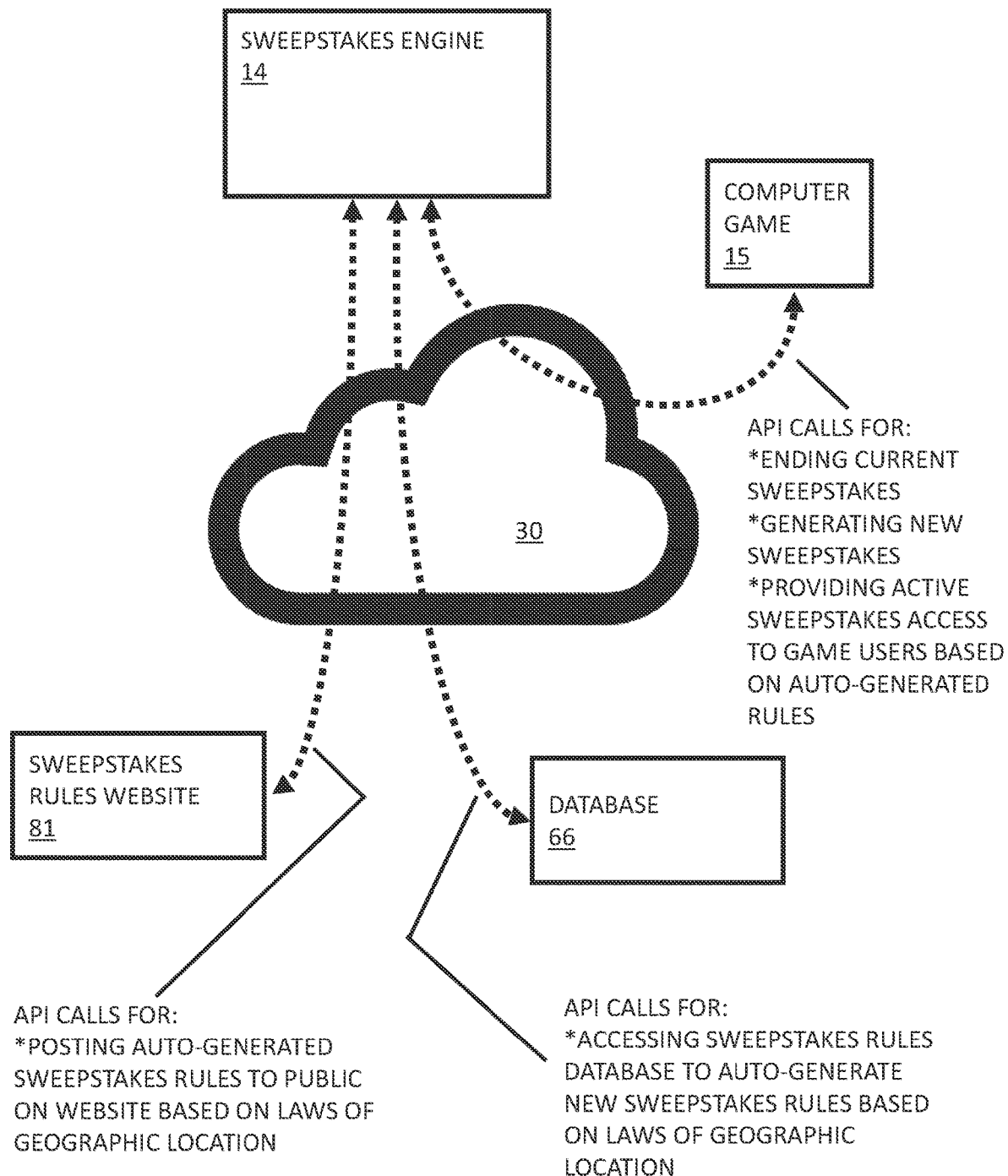
FIG. 19 illustrates a block diagram showing how the sweepstakes engine engages with the computer games, database, and sweepstakes rules website through the cloud to automatically create sweepstakes rules for each sweepstakes based on geographic based laws and regulations as stored within a rule-base contained within the database.

FIG. 19 illustrates a block diagram showing how the sweepstakes engine 14 engages with the computer games 15, database 66, and sweepstakes rules website 81 through the cloud 30 to automatically create sweepstakes rules for each sweepstakes contest based on geographic based laws and regulations as stored within a rule-base contained within the database 66. Sweepstakes engine 14 is in bidirectional communication with database 66 through cloud 30. Sweepstakes engine 14 utilizes API calls to database 66 for accessing the sweepstakes rules database to autogenerate new sweepstakes rules based on laws of geographic location pursuant to process 4000 and 8000. Once sweepstakes engine 14 has created a set of sweepstakes rules based on automatically selecting rules pursuant to process 8000, sweepstakes engine 14 pushes out the auto-generated rules to a sweepstakes rules website 81 so that the sweepstakes rules are publicly posted for regulatory compliance. Once the sweepstakes engine 14 generates a new sweepstakes contest with rules, it pushes out all information on that sweepstakes to all instances of computer games 15 within a geographic area where each computer game 15 has an IP address within the geographic area of the rules for the sweepstakes contest. The computer game 15 provides its IP address to the sweepstakes engine 14 so that it knows which sweepstakes contest the computer game 15 should participate in. When one sweepstakes contest ends, the sweepstakes engine 14 then repeats process 4000 and 8000 to auto-generate a new sweepstakes contest with new rules for that contest.

Figure 20:
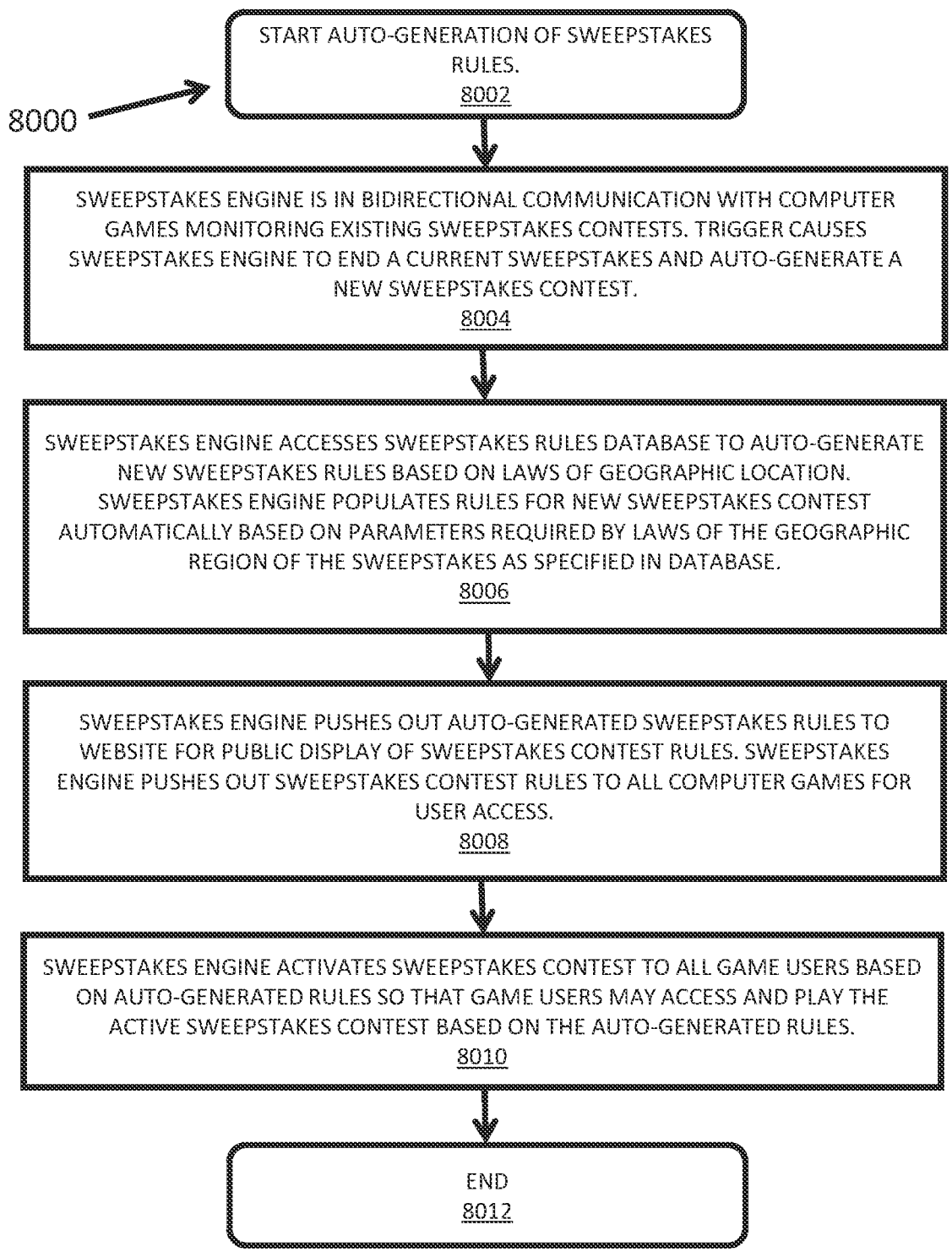
FIG. 20 depicts a flowchart illustrating a process for automatically generating a set of sweepstakes rules based on laws and regulations for a geographic area utilizing API calls for player locations, a website for posting rules contests, and a database containing geographic based sweepstakes laws and regulations.

FIG. 20 depicts a flowchart 8000 illustrating a process for automatically generating a set of sweepstakes rules based on laws and regulations for a geographic area utilizing API calls for player locations, a website 81 for posting rules contests, and a database 66 containing geographic based sweepstakes laws and regulations. Auto-generation of sweepstakes and sweepstakes rules is a necessary component of having a sweepstakes engine that can maintain a series of sweepstakes to have a constant RTP of a large community of online gaming players. The process of auto-generating sweepstakes rules begins with START in step 8002. In step 8004, sweepstakes engine is in bi-directional communication with computer games 15 monitoring the existing sweepstakes contest and receiving player entries. Triggering a threshold causes sweepstakes engine to end a current sweepstakes and auto-generate a new sweepstakes contest pursuant to process 4000. In step 8006, sweepstakes engine 14 accesses sweepstakes rules database 66 to auto-generate new sweepstakes rules based on laws of geographic region. Sweepstakes engine populates rules for new sweepstakes contests automatically without human intervention based on parameters required by laws of the geographic region of the sweepstakes as specified in the database 66. Database 66 stores sweepstakes rules based on geographic region. When sweepstakes engine 66 wants to generate a new sweepstakes, it looks up the laws for the geographic region within database 66 for the region in which the sweepstakes will occur and use those rules as the rules for the contest. In step 8008, sweepstakes engine 14 pushes out the auto-generated sweepstakes rules to website 81 for public display of the sweepstakes contest rules. Sweepstakes engine 14 also pushes out the auto-generated rules to all computer games 15 for user access. In step 8010, sweepstakes engine 14 then activates the sweepstakes contest for all game users based on the auto-generated rules so that game users may access and play the active sweepstakes contest based on the auto-generated rules. The process ENDS in step 8012.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A non-transitory computer readable medium containing computer-readable instructions that upon processing by a computer effect a method of implementing a sweepstakes contest with a fixed prize value and a variable duration within online computer games, of a plurality of online computer games comprising a distributed computer network, the sweepstakes contest operating in a cloud-based computer in communication with each of the plurality of online computer games, the method of implementing the sweepstakes contest games comprising the steps of:
 operating a sweepstakes engine at the cloud-based computer in bi-directional communication with each of the plurality of online computer games operating on separate computing devices,
 wherein each of the plurality of online computer games awards digital sweepstake entries to respective online accounts accessible to each of the separate computer devices associated with each of the plurality of online computer games based upon electronic gaming activity occurring within each of the computer games;
 wherein the sweepstakes engine awards one of the digital sweepstake entries to each of the online accounts when an alternative method of entry (AMOE) is utilized to acquire the respective sweepstake entries, thereby converting the AMOE into the digital sweepstakes entries to facilitate immediate awarding of sweepstakes prizes at a termination of a sweepstakes contest by the sweepstakes engine;
 wherein the digital sweepstakes entries are entered into a sweepstakes contest managed by the sweepstakes engine from the online account through electronic communications that issue from the computing devices to the cloud-based sweepstakes engine;
 wherein the sweepstakes contest has a fixed initial duration that is accelerated to an earlier date if an amount of digital sweepstakes entries collected by the cloud-based sweepstakes engine reaches a set threshold, and wherein the cloud-based sweepstakes engine immediately awards a sweepstakes prize through an electronic message to the online account when the set threshold is reached.

2. The non-transitory computer readable medium of claim 1, wherein the sweepstakes contest is immediately awarded when a fixed initial duration expires when an amount of digital sweepstakes entries does not reach a set threshold.

3. The non-transitory computer readable medium of claim 2, wherein the online computer game includes a Graphical User Interface (GUI) for selecting the amount of digital sweepstakes entries to push to the sweepstakes engine for entry into the sweepstakes contest, wherein the computing devices are either portable electronic devices or computer terminals, and wherein the sweepstakes engine pushes winner information immediately to the online computer games when a winning digital sweepstakes entry is selected.

4. The non-transitory computer readable medium of claim 1, wherein the sweepstakes engine automatically generates a new sweepstakes contest for play on the online computer games when the sweepstakes contest is finished and a prize is awarded, wherein the sweepstakes engine automatically generates a set of rules of the new sweepstakes contest from a database of geographic based sweepstakes rules, and wherein the sweepstakes engine automatically pushes the set of rules for the new sweepstakes contest for online publication on a website for sweepstakes contest rules operated for public viewing.

5. The non-transitory computer readable medium of claim 4, wherein the sweepstakes engine limits access to play the new sweepstakes contest to those online computer games that have an IP address within a geographic area set for the new sweepstakes contest, and wherein the digital sweepstakes entries are selected from the group consisting of electronic tickets, electronic entries, cryptocurrency, Non-Fungible Tokens (NFTs), electronic money, and digital currency.

6. The non-transitory computer readable medium of claim 4, wherein the sweepstakes engine automatically generates the new sweepstakes contests to maintain a constant Return-To-Player value for players associated with each of the online computer operating on each of the respective separate computer devices through the sweepstakes contests.

7. The non-transitory computer readable medium of claim 1, wherein the sweepstakes engine records collected digital sweepstakes entries within a sweepstakes contest blockchain, wherein the sweepstakes contest blockchain is used to award a winner of the sweepstakes contest by randomly selecting a blockchain block from the new sweepstakes contest blockchain and naming the player who entered the new sweepstakes entry into the selected blockchain block as the winner.

* * * * *